United States Patent [19]
Riley et al.

[11] Patent Number: 5,959,726
[45] Date of Patent: Sep. 28, 1999

[54] MODULATION TRANSFER FUNCTION TEST COMPENSATION FOR TEST PATTERN DUTY CYCLE

[75] Inventors: James K. Riley, Redmond; William E. Ortyn, Devall; Yuhui Cheng, Redmond; Tuan H. Phan, Lynwood; Wayne A. Biggs, Kirkland, all of Wash.

[73] Assignee: NeoPath, Inc., Redmond, Wash.

[21] Appl. No.: 08/900,341

[22] Filed: Jul. 25, 1997

[51] Int. Cl.$^6$ ................................................. G01M 11/00
[52] U.S. Cl. ............................................................ 356/124.5
[58] Field of Search ................................ 356/124.5, 124, 356/239

[56] References Cited

U.S. PATENT DOCUMENTS

| | | | |
|---|---|---|---|
| 3,549,240 | 12/1970 | Sawatari | 356/124.5 |
| 3,743,427 | 7/1973 | Weiser | 356/124 |
| 4,586,817 | 5/1986 | Ehemann, Jr. | 356/124.5 |
| 4,812,412 | 3/1989 | Turner | 436/15 |
| 4,965,725 | 10/1990 | Rutenberg | 364/413.1 |
| 5,072,382 | 12/1991 | Kamentsky | 364/413.08 |
| 5,125,100 | 6/1992 | Katznelson | 455/6.1 |
| 5,206,919 | 4/1993 | Keating | 382/46 |
| 5,257,182 | 10/1993 | Luck et al. | 382/36 |
| 5,265,112 | 11/1993 | Noll et al. | 372/32 |
| 5,287,272 | 2/1994 | Rutenberg et al. | 382/15 |
| 5,315,700 | 5/1994 | Johnston et al. | 395/163 |
| 5,361,140 | 11/1994 | Hayenga et al. | 348/255 |
| 5,396,479 | 3/1995 | Johann | 369/59 |
| 5,572,158 | 11/1996 | Lee et al. | 327/175 |
| 5,621,519 | 4/1997 | Frost et al. | 356/124.5 |
| 5,629,766 | 5/1997 | Kaplan | 356/124.5 |

OTHER PUBLICATIONS

Bacus, James W. and Les J. Grace, "Optical Microscope System For Standardized Cell Measurements and Analyses", *Applied Optics*, 26:16, pp. 3280–3293, Aug. 15, 1987.

Smith, Warren J., "Modern Optical Engineering: The Design of Optical Systems", Copyright ©1966 by McGraw–Hill Book Company, pp. 308–325.

Weber, J.E. et al., "Fuzzy Reasoning, Possibility Theory and Probability Theory in Expert Systems for Histopathology", IEEE/Ninth Annual Conference of the Engineering in Medicine and Biology Society, pp. 1560–1561, ©1987.

*Primary Examiner*—Hoa Q. Pham
*Attorney, Agent, or Firm*—Hans I. Sun; Emil Moffa

[57] ABSTRACT

Improving accuracy of frequency response measurements of linear systems using modulation transfer function test compensation. An optical imaging system illuminates and images an input test pattern. A processor measures a modulation transfer function. The processor determines a compensating factor for error in the input test pattern duty cycle. The driving function for the measurement is a test pattern having a periodic waveform approximating a square wave with an error in duty cycle. A windowed fast fourier transform on a greyscale image of the test pattern generates odd harmonics. Adjusting amplitude values of the odd harmonics corrects for the error in resolution target duty cycle.

34 Claims, 25 Drawing Sheets

Fig_22

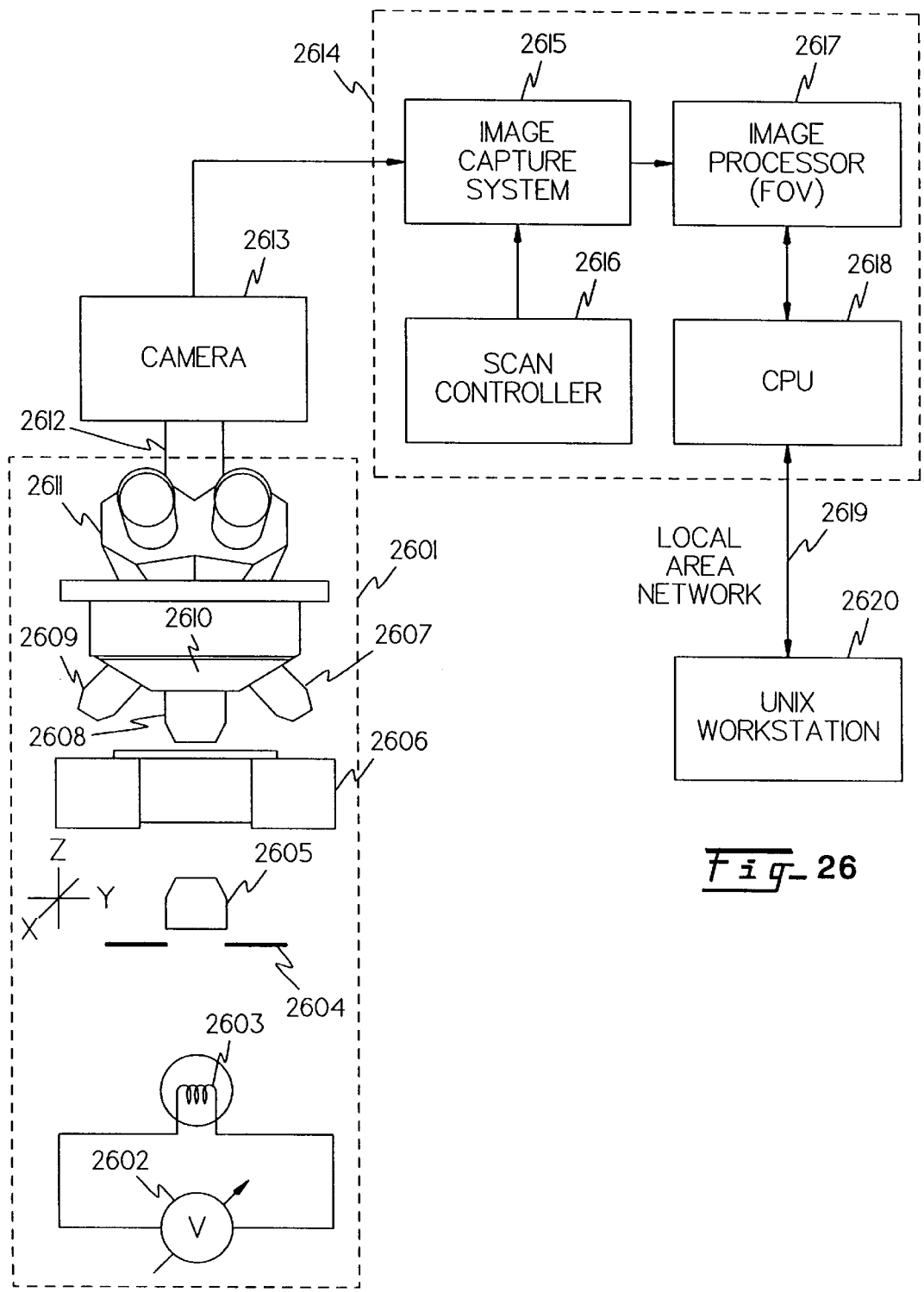
Fig_26

MODULATION TRANSFER FUNCTION TEST COMPENSATION FOR TEST PATTERN DUTY CYCLE

NOTICE RE COPYRIGHT

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

The invention relates to the measurement of the system transfer function of a linear, time-invariant system, such as an optical imaging system, and more particularly to a modulation transfer function test compensation for variations in test pattern duty cycle.

Refer now to FIG. 1 which shows a square wave as a function of time. The system transfer function, STF, of an optical imaging system is composed of both the modulation transfer function, MTF, and the phase transfer function, PTF. Optical test patterns and an image analysis computer program have been used to measure the STF. For example, one such system is described in U.S. Pat. No. 5,621,519, entitled "Imaging System Transfer Function Control Method and Apparatus," issued Apr. 15, 1997 to Frost et al. that is incorporated by reference hereto. In Frost et al. the optical test pattern apparatus is intended for use with a microscope of high magnification and employs a test pattern with test pattern geometry having very small dimensions. The test pattern geometry includes bar patterns. These bar patterns have a duty cycle. An ideal square wave is a function that can take on only two values. FIG. 1 illustrates such a function. The duty cycle is defined as the ratio of the length of time in a single cycle for which the function's value is at the high level divided by the period of the function. FIG. 1 shows a duty cycle equal to W divided by T. An example ideal bar pattern duty cycle is 50%, or half of the pattern being light and half of the pattern being dark.

The required small dimension test pattern geometry makes it difficult to manufacture the test pattern. The limitations of the test pattern fabrication preclude the production of a large number of test patterns with a bar pattern duty cycle precisely equal to 50%. Errors in the bar pattern duty cycle cause errors in the MTF measurement and in the STF measurement. The current invention provides a method for compensating for errors in the test pattern duty cycle, thus restoring the accuracy of the MTF measurement when a test pattern with duty cycle other than 50% is used.

SUMMARY OF THE INVENTION

The invention provides a method for improving the accuracy of frequency response measurements of linear systems wherein the driving function for the measurement is a periodic waveform approximating a square wave but having an error in duty cycle.

The invention is of particular utility when the frequency response measurement is used to qualify an optical instrument for use in a critical application. The invention improves the accuracy of the measurement, reducing the risk that a deficient instrument will be applied in the critical application.

The invention further provides a method of utilizing a measured test pattern duty cycle. The invention images a test pattern having a duty cycle, wherein the test pattern has alternating transmissive and opaque bars, to generate a greyscale image. A windowed FFT is performed on the greyscale image to generate odd harmonics wherein each odd harmonic value has an amplitude value. An adjustment value is computed for each amplitude value of the odd harmonics based on the measured test pattern duty cycle to compensate for any error in the duty cycle.

The invention also provides an apparatus for the measurement of flaws in a test pattern duty cycle from a predetermined reference value. The apparatus comprises a means for illuminating the test pattern and a means for imaging the illuminated test pattern having an image output. The apparatus further comprises a means for processing the image output to determine a compensation for the flaws in the test pattern duty cycle.

The invention provides a method of compensating a modulation transfer function measurement of an optical imaging system for variation in a test pattern duty cycle from a reference value. Error is measured in the test pattern duty cycle. A modulation transfer function is measured and the modulation transfer function is compensated for the error in the test pattern duty cycle.

The invention further provides an apparatus for compensating a modulation transfer function measurement of an optical imaging system for error in input test pattern duty cycle. The apparatus comprises a means for illuminating a test pattern and a means for imaging the illuminated test pattern through the optical system having an image output. The apparatus further provides a means for measuring the modulation transfer function and a means for processing the measured modulation transfer function to compensate for error in the input test pattern duty cycle based on a predetermined compensation.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIG. 26 shows a block diagram of the resolution target metrology station used to inspect the resolution targets and measure the duty cycles of the bar patterns.

DETAILED DESCRIPTION OF THE PREFERRED EMBODIMENT

Figure 1:
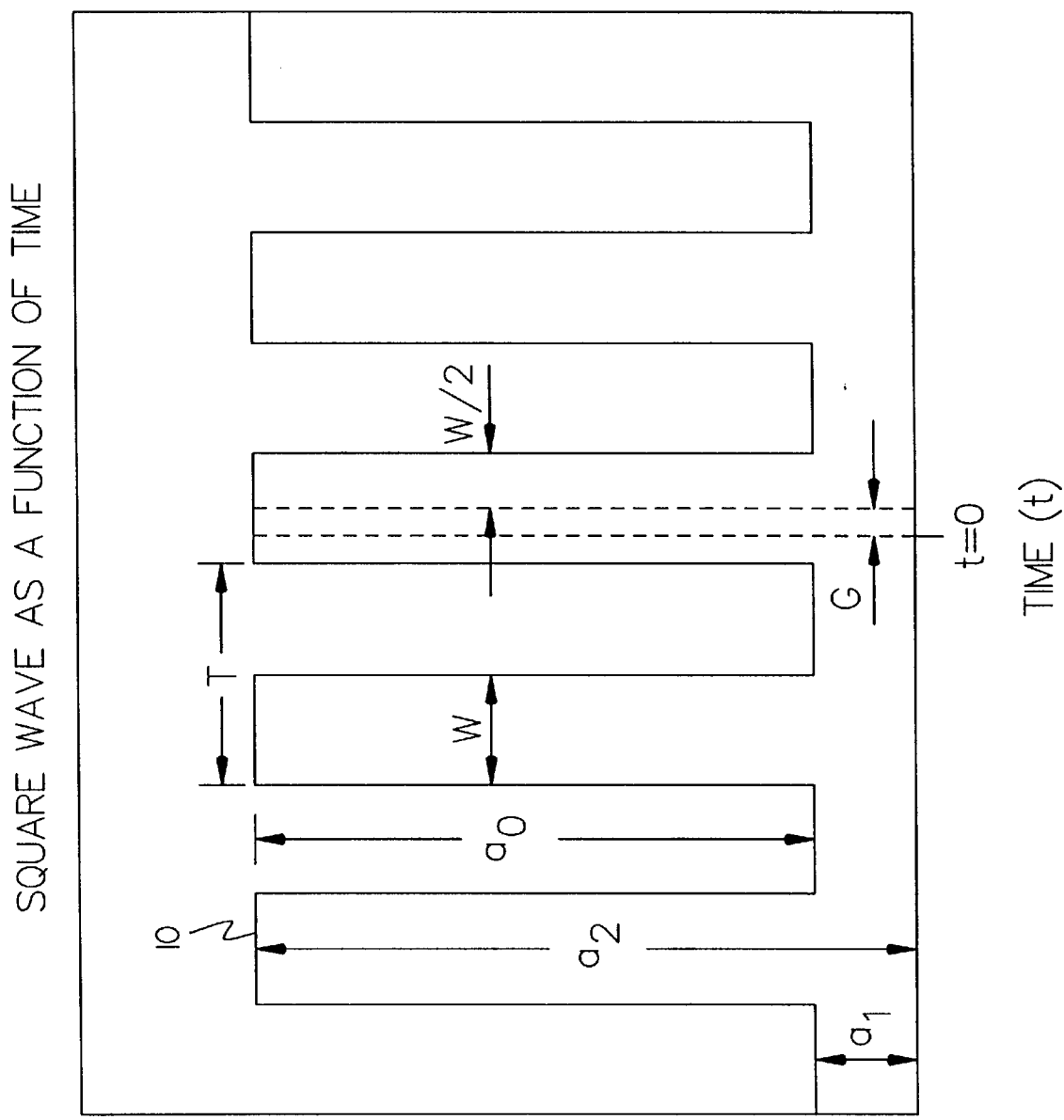
FIG. 1 shows an ideal square wave as a function that can take on only two values.

Refer again to FIG. 1 which shows an ideal square wave function 10. The ideal square wave function 10 is a function that can take on only two values. The duty cycle of the square wave function 10 is defined as the ratio of the length of time in a single cycle for which the square wave function's value is at the high level divided by the period of the square wave function. In FIG. 1, then, the duty cycle is equal to W divided by T.

A series of discrete frequencies of zero spectral width, described by a Fourier series, is the spectrum of a periodic function of infinite extent. The first term in the series is the zero-frequency term, which is the average of the function over infinite time, commonly known as the d.c. term. The next term in the series resides at the frequency 1/T and is known as the fundamental frequency. All other terms in the series are integer multiples of the fundamental frequency and are called the harmonics.

It is the fundamental premise of the Fourier Transform method of signal analysis that any function f(t) that is continuous over some interval, is exactly represented as the sum of an infinite series of orthogonal base functions over that interval. For the Exponential Fourier Series, the theorem just stated leads to the following equation:

$$f(t) = F_0 + F_1 e^{j\omega_0 t} + F_2 e^{j2\omega_0 t} + \ldots + F_n e^{jn\omega_0 t} + \ldots + F_1 e^{-j\omega_0 t} + F_2 e^{-j2\omega_0 t} + \ldots + F_n e^{-jn\omega_0 t} = \sum_{n=-\infty}^{\infty} F_n e^{jn\omega_0 t}$$

For the optimum values of the coefficients, the integral of the approximating series taken over the interval −T/2 to T/2 equals the integral of the actual function f(t), which is equivalent to stating that the approximation of the function f(t) converges in the mean. For the complex exponential base functions, this condition exists when the following equation is satisfied:

$$\int_{t=-T/2}^{T/2} f(t) e^{-jn\omega_0 t} dt = \int_{t=-T/2}^{T/2} F_n e^{jn\omega_0 t} e^{-jn\omega_0 t} dt$$

therefore:

$$F_n = \frac{\int_{t=-T/2}^{T/2} f(t) e^{-jn\omega_0 t} dt}{\int_{t=-T/2}^{T/2} e^{jn\omega_0 t} e^{-jn\omega_0 t} dt} = \frac{1}{T} \int_{t=-T/2}^{T/2} f(t) e^{-jn\omega_0 t} dt$$

The Fourier series coefficients for one cycle of the wave form of FIG. 1 is calculated from this equation using integration by parts:

$$F_n = \frac{1}{T} \left[ \int_{t=-T/2}^{G-T/2} a_1 e^{-jn\omega_0 t} dt + \int_{t=G-DT/2}^{G+DT/2} a_0 e^{-jn\omega_0 t} dt \right]$$

where:

$$D = W/T = \text{duty cycle}$$

$$a_0 = a_2 - a_1$$

The integration over the complex exponential in the general case is:

$$\left(\int_{t=r}^{s} Ae^{-jn\omega_0 t} dt = \frac{jAe^{-jn\omega_0 t}}{n\omega_0}\bigg|_r^s\right.$$

$$\left(= \frac{jA}{n\omega_0}[\cos n\omega_0 t - j\sin n\omega_0 t]\bigg|_r^s\right)$$

$$\left(= \frac{A}{n\omega_0}[\sin n\omega_0 t + j\cos n\omega_0 t]\bigg|_r^s\right)$$

Applying this form to the calculation of the coefficients for the waveform of FIG. 1:

$$\frac{a_1}{n\omega_0 T}[\sin n\omega_0 t + j\cos n\omega_0 t]\bigg|_{-T/2}^{T/2} +$$

$$\frac{a_0}{n\omega_0 T}[\sin n\omega_0 t + j\cos n\omega_0 t]\bigg|_{G-DT}^{G+DT}$$

The first term in the above equation reduces to:

$$\frac{2a_1}{n\omega_0 T}\sin n\pi = 0$$

The waveform low level component that seems to have been eliminated in this treatment will contribute to the dc part of the series for the special case of n=0, below.

Evaluating the second term in the equation for the Fourier coefficients, $$F_n = \frac{a_0}{n\omega_0 T}\left[2\sin\frac{n\omega_0 DT}{2}\cos n\omega_0 G - j2\sin\frac{n\omega_0 DT}{2}\sin n\omega_0 G\right]$$

since: $\omega_0 = \frac{2\pi}{T}$ $$F_n = \frac{a_0}{n\pi}\sin n\pi D\left[\cos 2\pi\frac{nG}{T} - j\sin 2\pi\frac{nG}{T}\right]$$

$$= a_0 D\text{sinc}(n\pi D)e^{-j\omega_0 nG}$$

Returning to the initial expression of the waveform as the sum of complex exponentials:

$$f(t) = \sum_{N=-\infty}^{\infty} F_n e^{jn\omega_0 t} = \sum_{n=-\infty}^{\infty} a_0 D\text{sinc}(n\pi D)e^{-j\omega_0 nG}e^{jn\omega_0 t}$$

The dc term, which is the component in the series for n=0, is a special case:

$$F_0 = \frac{1}{T}\int_{t=-T/2}^{T/2} f(t)e^0 dt$$

$$= \frac{1}{T}\int_{t=-T/2}^{T/2} f(t)dt$$

This is just the time average of the waveform over the interval from −T/2 to T/2.

It is convenient to simplify the series by recognizing that each of the positive frequency components has a corresponding negative component that is its complex conjugate. A new series constructed using only positive values of n, summing the two parts of each pair, and adding the d.c. term is described as:

$$f(t) = \sum_{n=1}^{\infty}(a_0 D\text{sinc}(n\pi D)e^{-j\omega_0 nG}e^{-jn\omega_0 t} +$$

$$a_0 D\text{sinc}(n\pi D)e^{j\omega_0 nG}e^{jn\omega_0 t}) + F_0$$

$$= \sum_{n=1}^{\infty} a_0 D\text{sinc}(n\pi D)(e^{-j\omega_0 n(G+t)} + e^{j\omega_0 n(G+t)}) + F_0$$

However: $e^{jx} + e^{-jx} = 2\cos x$ therefore, $$f(t) = \sum_{n=1}^{\infty} a_0 D\text{sinc}(n\pi D)\cos\left[\frac{2\pi n}{T}(G+t)\right] + F_0$$

Figure 2:
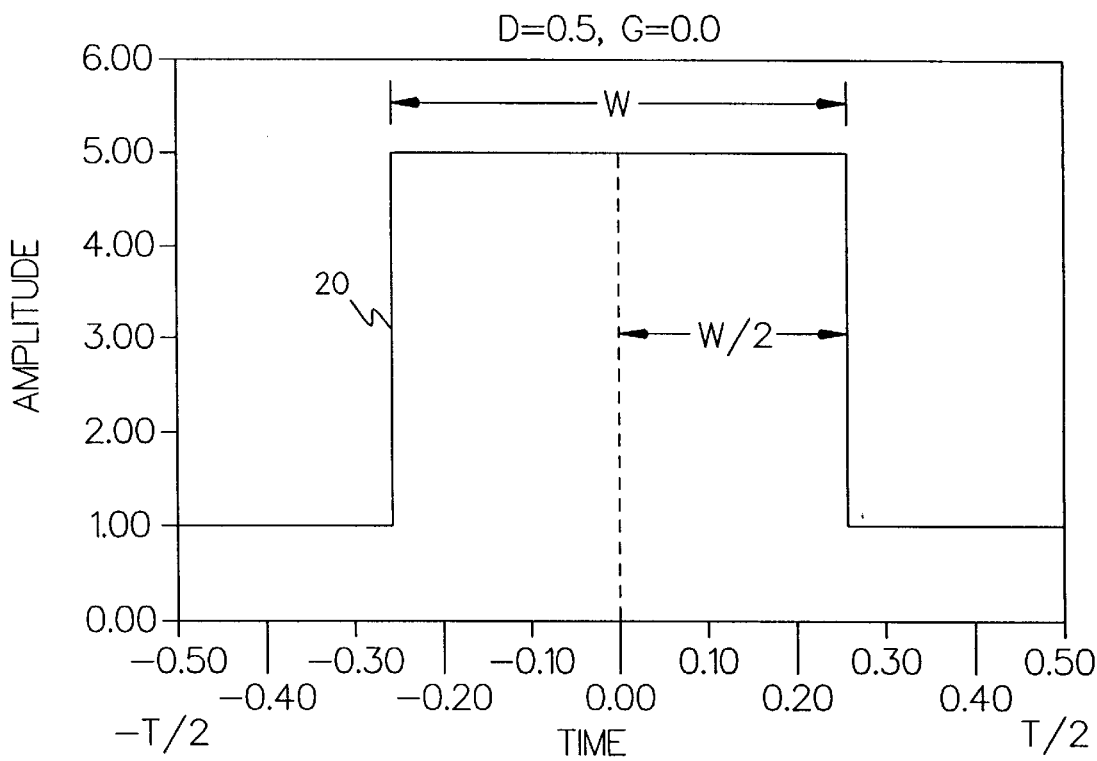
FIG. 2 shows a single period of a square wave of duration 1.0 and duty cycle 0.5 of amplitude 4.0 with a positive d.c. offset of 1.0.
Figure 3:
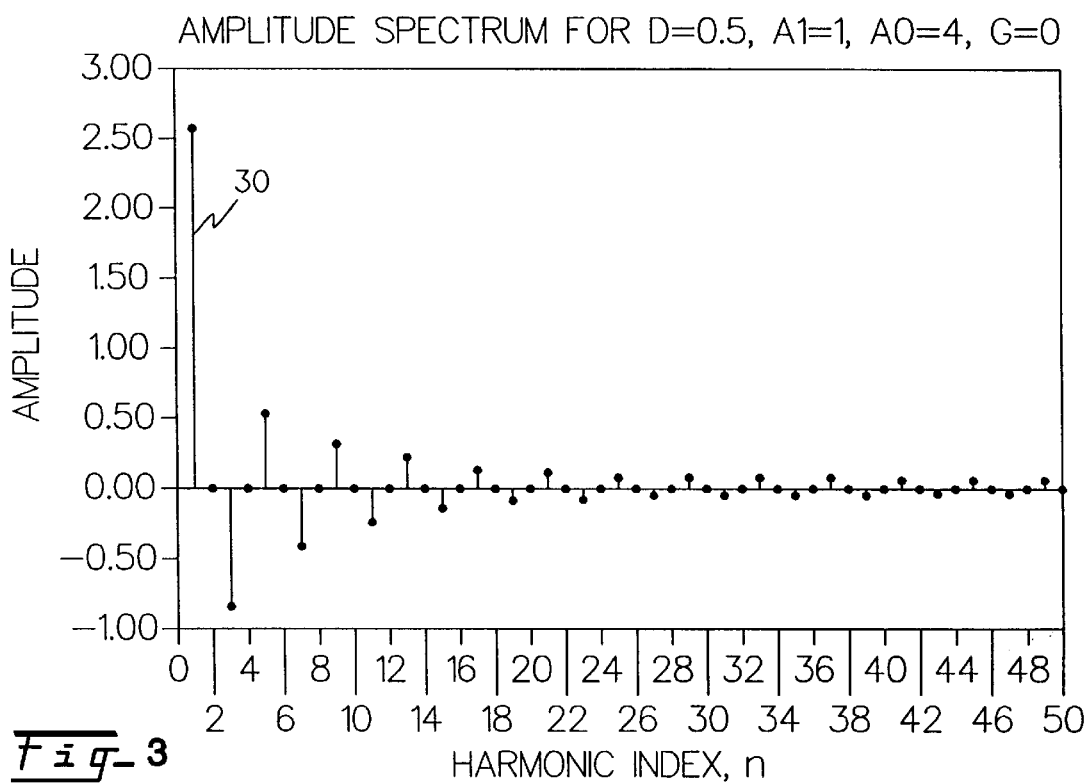
FIG. 3 shows a plot of the amplitudes of the Fourier series components.

Refer now to FIG. 2 which shows a single period 20 of a square wave function of duration 1.0 and duty cycle 0.5 of amplitude 4.0 with a positive d.c. offset of 1.0 and FIG. 3 which shows a plot of the amplitudes 30 of the Fourier series components. The even harmonic amplitudes are all zero. Furthermore, no phase plot is given because the time offset, G, is zero, and all of the harmonics are at zero phase.

Figure 4:
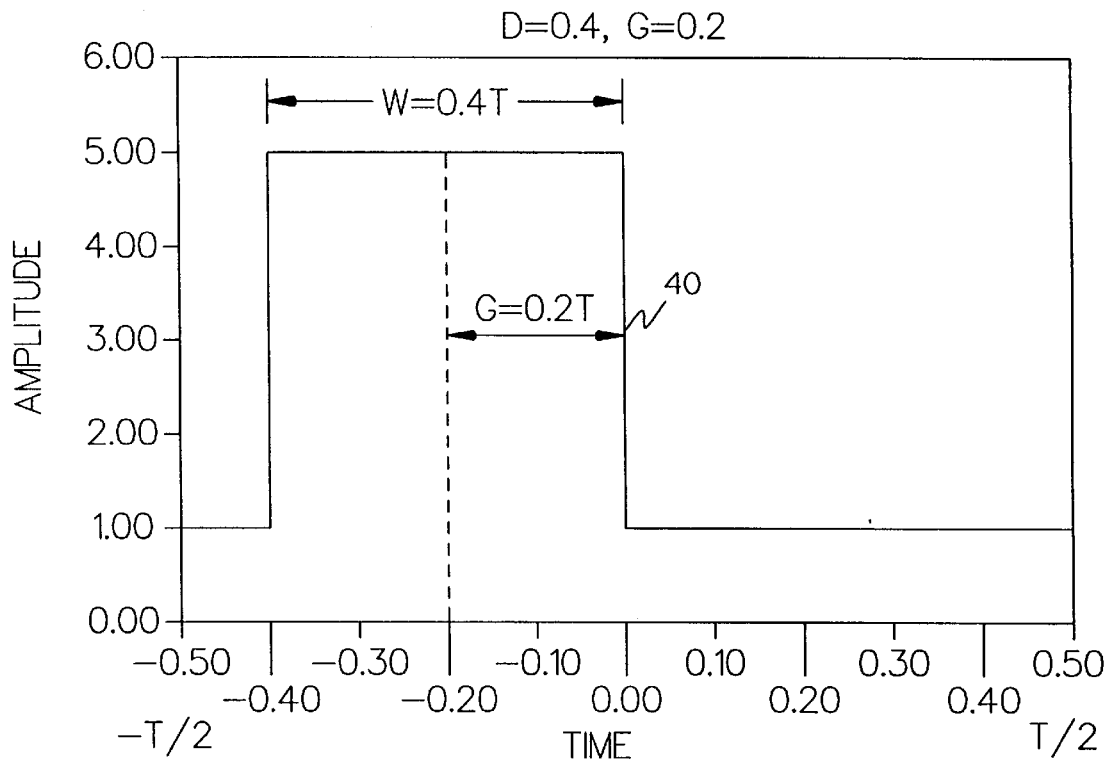
FIG. 4 shows a single period of a square wave of duration 1.0 and duty cycle 0.4 of amplitude 4.0 with a positive d.c. offset of 1.0.
Figure 5:
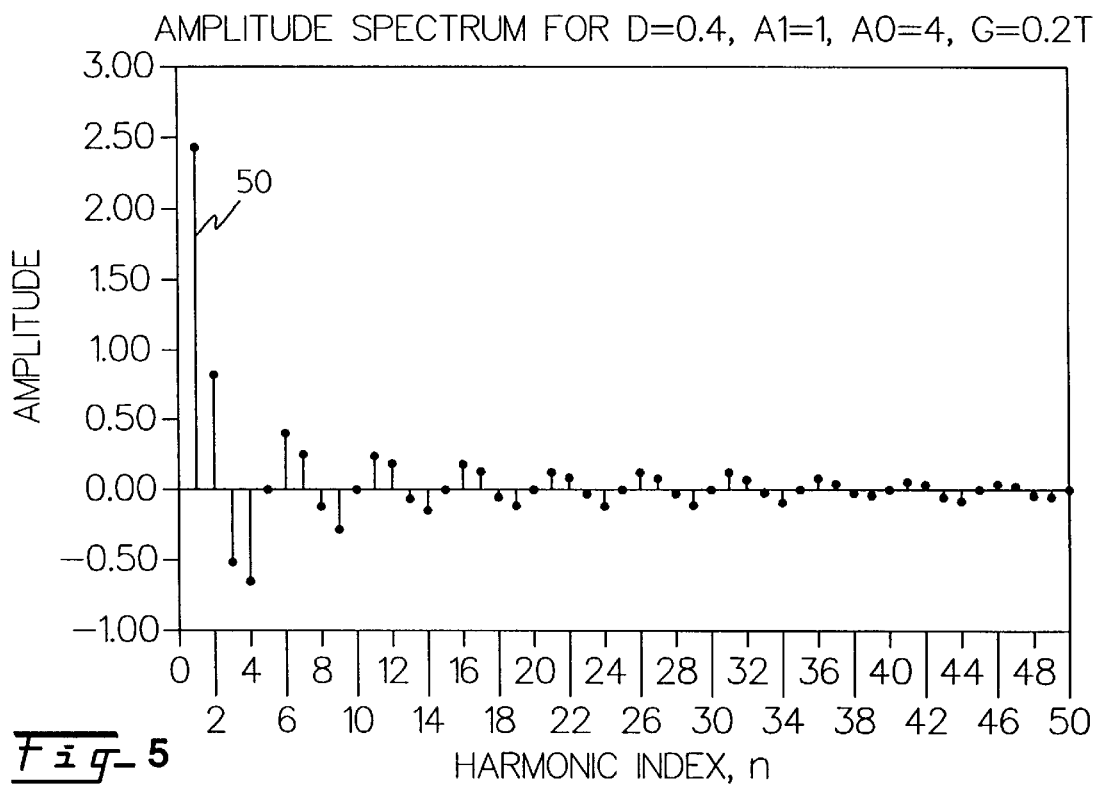
FIG. 5 shows a plot of the amplitudes of the Fourier series components.

Refer now to FIG. 4 which shows a single period 40 of a square wave of duration 1.0 and duty cycle 0.4 of amplitude 4.0 with a positive d.c. offset of 1.0. In this case, the time offset, G, is 0.2. Also refer to FIG. 5, which shows a plot of the amplitudes 50 of the Fourier series components. There is now energy in both the even and the odd harmonics.

Figure 6:
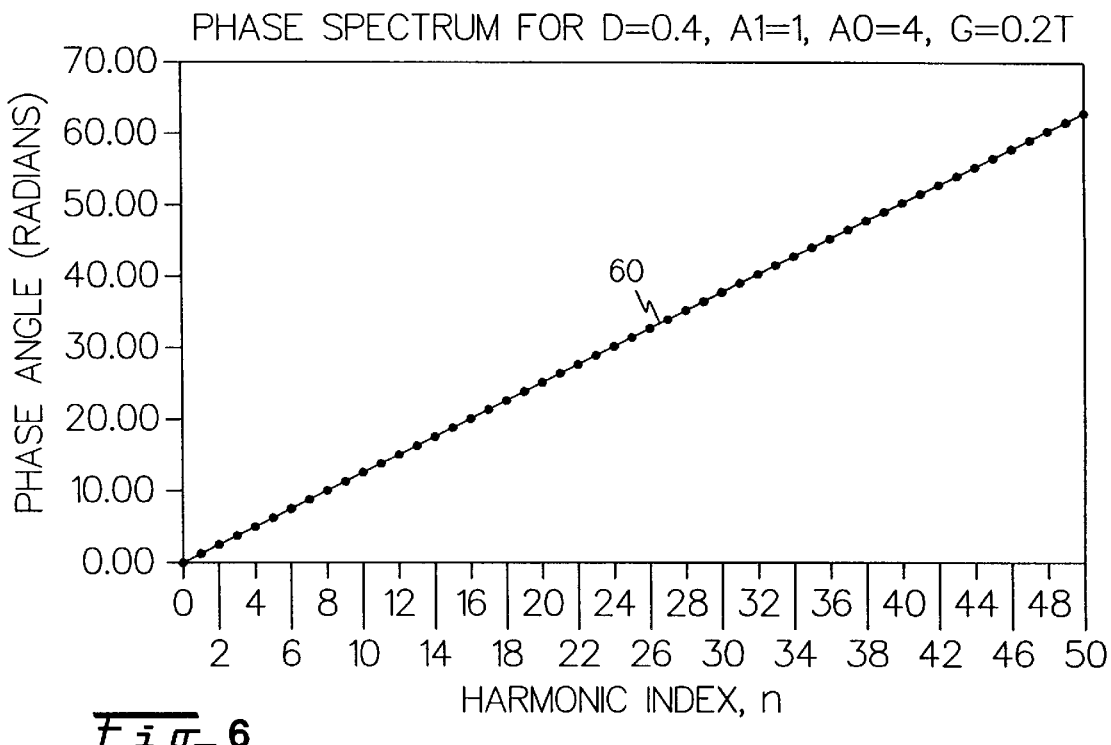
FIG. 6 shows a plot of the phase values of the harmonics.

Refer now to FIG. 6 which shows a plot 60 of the phase values of the harmonics. The time offset, G, has introduced a linear phase term of slope 0.47π radians/harmonic.

The derivation of the Fourier series considered only a waveform of duration T. This description may be extended to the time span of −π to π for applications to continuous periodic signals. For a signal of period T, f(t+T)=f(t). That the same Fourier series is accurate for every period of the waveform is proven as follows:

if $f(t) = \sum_{n=-\infty}^{\infty} F_n e^{jn\omega_0 t}$,

Then $f(t+T) = \sum_{n=-\infty}^{\infty} F_n e^{jn\omega_0(t+T)}$ $$= \sum_{n=-\infty}^{\infty} F_n e^{jn\omega_0(t+2\pi/\omega_0)}$$

$$= \sum_{n=-\infty}^{\infty} F_n e^{jn\omega_0 t} e^{j2\pi n}$$

Since the harmonic index value, n, takes on only integer values, $e^{j2\pi n} = \cos(2\pi n) + j\sin(2\pi n) = 1 + j0 = 1$ The same principle applies to adding or subtracting any number of periods from the time value. Hence, the Fourier series yields the value of the periodic waveform at any time.

The amplitude response of a linear, time invariant system at each of the harmonic frequencies is found from the ratio of the amplitude of the harmonic in the system's output to the amplitude of the harmonic in the driving function. The phase response of a system at a given harmonic is determined as the difference of phase of the harmonic in the system's output and the phase of the harmonic in the driving function. Thus:

$$H(n)\angle\theta(n) = \frac{A_{out}(n)}{A_{in}(n)} \angle[\phi_{out}(n) - \phi_{in}(n)]$$

The response of the system at d.c. is just the ratio of the d.c. part of the output to the d.c. part of the driving function 70, since there is no phase defined at d.c. Thus:

$$H(0) = \frac{A_{out}(0)}{A_{in}(0)}$$

For the case of the periodic square wave, the input amplitude terms are:

$$A_{in}(0) = F_0 = \frac{1}{T}\int_{t=-T/2}^{T/2} f(t)dt = a_1 + a_0 D$$

and $$A_{in}(n) = 2a_0 D \text{sinc}(n\pi D)$$

Figure 7:
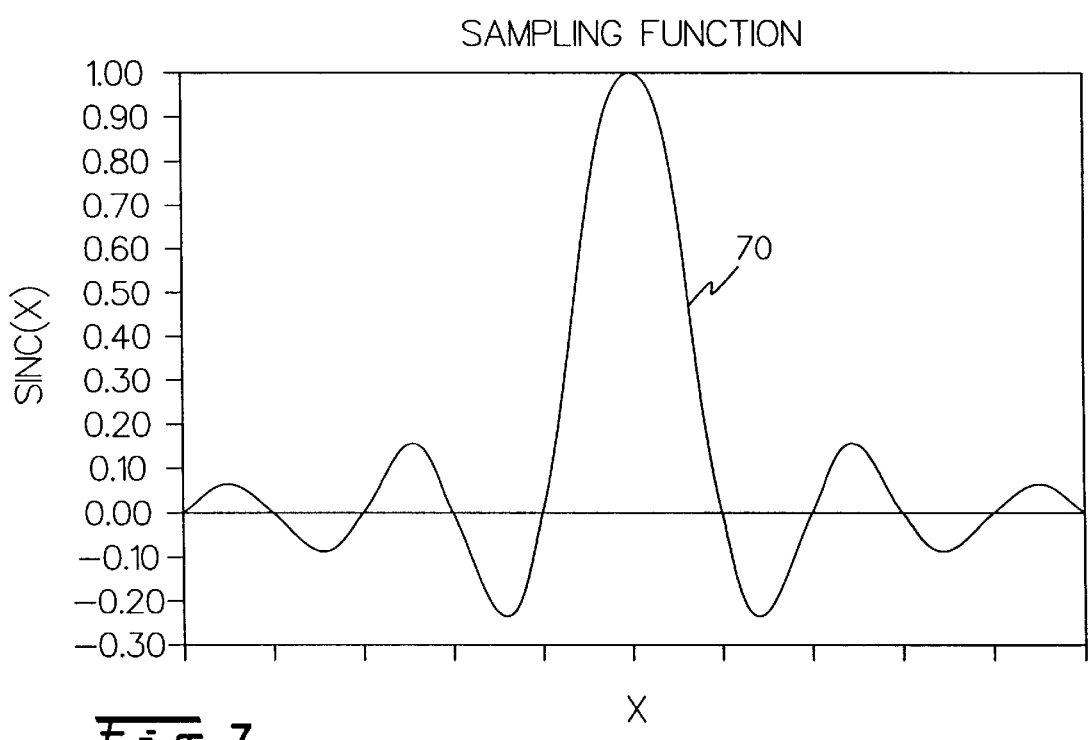
FIG. 7 shows a sampling function with damped oscillation in both directions from x equals zero.

Refer now to FIG. 7 which shows the sinc(x) function, equal to sin(x)/x, also known as the Sampling Function because of its relation to the rectangular sampling window. The sinc(x) is an essential element of this derivation. In the limit of x=0, the sampling function has the value 1.0. The function follows as damped oscillation in both directions from x=0, as shown in FIG. 7.

Figure 8:
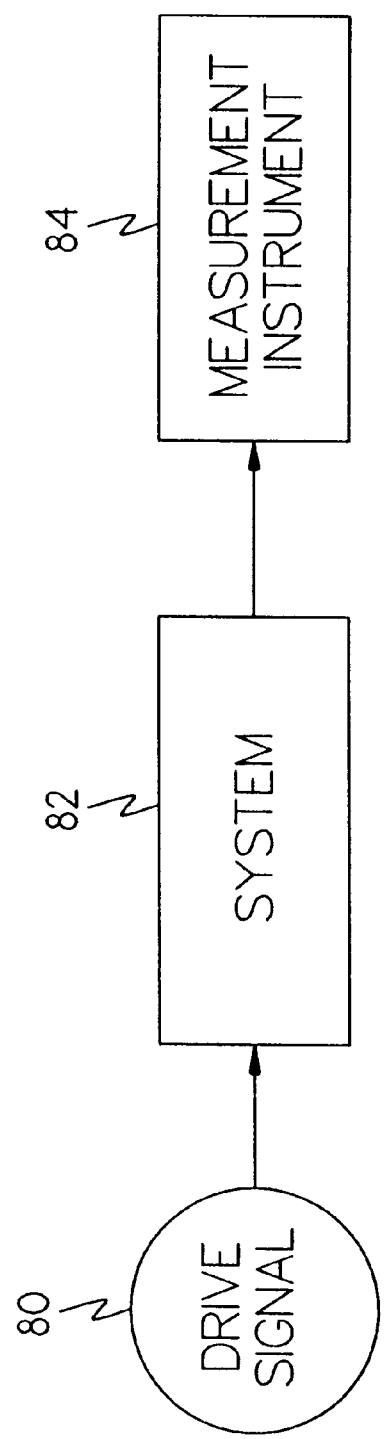
FIG. 8 shows that the measurement of the frequency response of a system.

Refer now to FIG. 8 which shows a generalized transfer function measurement method. The measurement of the frequency response of a system 82 is accomplished with a complete knowledge of the drive signal 80, as derived above, and an instrument 84 for measuring the gain and phase of each harmonic in the output signal.

The amplitude transfer function of the system in the steady state is found by applying a periodic square wave to the input of the system, measuring the amplitude of each harmonic in the output signal, and dividing by the amplitudes of the harmonics of the input signal known from the Fourier series, as follows, $$H(0) = \frac{A_{out}(0)}{a_1 + a_0 D}$$

and $$H(n) = \frac{A_{out}(n)}{2a_0 D \text{sinc}(n\pi D)}$$

Knowledge of the square wave low level amplitude, high level amplitude, period, and duty cycle, then suffices in the computation of the system amplitude transfer function. The phase transfer function of the system in the steady state is found using the same configuration and subtracting the system output phase from the drive signal phase for each harmonic.

$$\theta(n) = \phi_{out}(n) - \phi_{in}(n)$$

If the frequency independent time delay through the system 82 is not of interest, it is useful to eliminate the linear phase term from the measurement. Since the time offset term, G, in the description of the square wave contributes the only phase shift from harmonic to harmonic and because this shift is linear with frequency, removal of the linear phase term from the output signal leaves only the frequency dependent phase shift characteristic of the system 82.

The linear phase shift in the output signal is removed by measuring the phase of the fundamental and subtracting that phase times the harmonic index from the phase of each harmonic. Thus, $$\theta(n) = \phi_{out}(n) - n\phi_{out}(1)$$

Note that:

$$\theta(1)|0$$

The phase transfer function is expressed as the phase shift of the harmonics relative to that of the fundamental with the time delay contribution to the phase shift removed. This is a useful characterization of a system because it reveals the part of the phase transfer function responsible for waveform distortion.

The invention provides a method for using a drive signal of the type shown in FIG. 1 to measure the frequency response of a linear, time invariant system with high accuracy even in the case in which the duty cycle of the drive signal 80 cannot be controlled to an exact value of 50%. Under some circumstances, a signal of this type is desirable for the ease with which it is generated, since the generating system is required only to switch the source between the lower and upper levels with a repetition rate equal to the fundamental frequency. Swept-frequency sinusoidal signal generators of high purity and constant amplitude and phase across a wide frequency range offer an alternative method, but one which is costly or otherwise impractical under some circumstances.

It is essential to understand the range of duty cycles over which this method is useful. As is seen from the Fourier series in FIG. 3, in which the duty cycle is 0.50, all of the energy of the drive signal is contained in the odd harmonics. The measurement instrument of FIG. 8 is designed to measure the odd harmonics to characterize the system 82. As the duty cycle deviates from 0.50, however, the amplitudes of the odd harmonics decrease. In fact, for each harmonic, there are duty cycle values that take the harmonic amplitude to zero. These nulls are contributed by the sinc(nπD) term in the expression for the harmonic amplitudes, as follows:

$$A_{in}(n) - 2a_0 D \text{sinc}(n\pi D)$$

if $n\pi D = m\pi$, $\text{sinc}(n\pi D) = 0$ and $m, n$ are integers

The null duty cycles are more easily found by expressing the duty cycle as the sum of its ideal value of 0.5 and an error. For the odd harmonics, $$D = 0.5 + \epsilon$$

$$\text{sinc}\left(\frac{n\pi}{2} + n\pi\epsilon\right) = 0 \quad \text{for} \quad n\epsilon = \frac{m}{2}$$

and $m, n$ are odd integers

As an example, the 25th harmonic will drop to zero amplitude for the duty cycle predicted as follows:

if $m = 1$ $$\epsilon = \frac{1}{2 \cdot 25} = .02$$

and $D_{null} = .52$ if $m = -1$ $$\epsilon = \frac{-1}{2 \cdot 25} = -.02$$

and $D_{null} = .48$

For each harmonic, the nulls repeat for m=−3, −5, −7 . . . and for m=3, 5, 7, . . . , with the limitation that the null duty cycle falls within the range of 0.0 to 1.0, the only values possible for the duty cycle.

Figure 9:
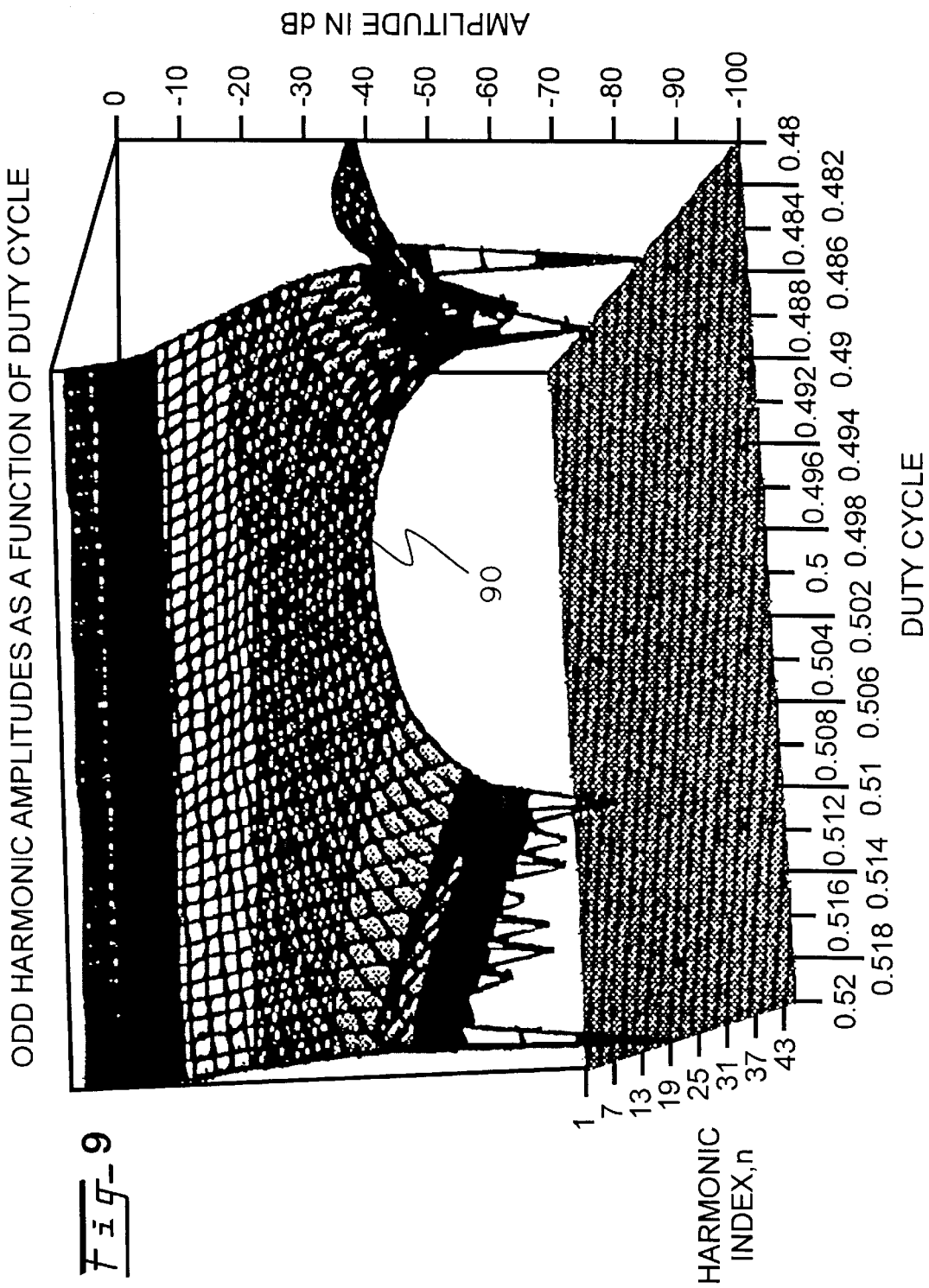
FIG. 9 shows a plot of the amplitudes of the odd harmonics in decibels through harmonic 49 for a range of duty cycles from 0.48 to 0.52.

Refer now to FIG. 9 which shows the odd harmonic amplitudes as a function of the duty cycle. FIG. 9 shows a plot 90 of the amplitudes of the odd harmonics in decibels through harmonic 49 for a range of duty cycles from 0.48 to 0.52. The deep trenches at the front corners of the plot 90 are in the neighborhood of the nulls described in the above derivation. Given that the measurement system is capable of a dynamic range of at least 40 dB, duty cycles from about 0.496 to 0.504 is used to retrieve all of the harmonics shown. For larger deviations from 0.50 in duty cycle, some of the harmonics will fall to very low values and is lost in the noise.

Figure 10:
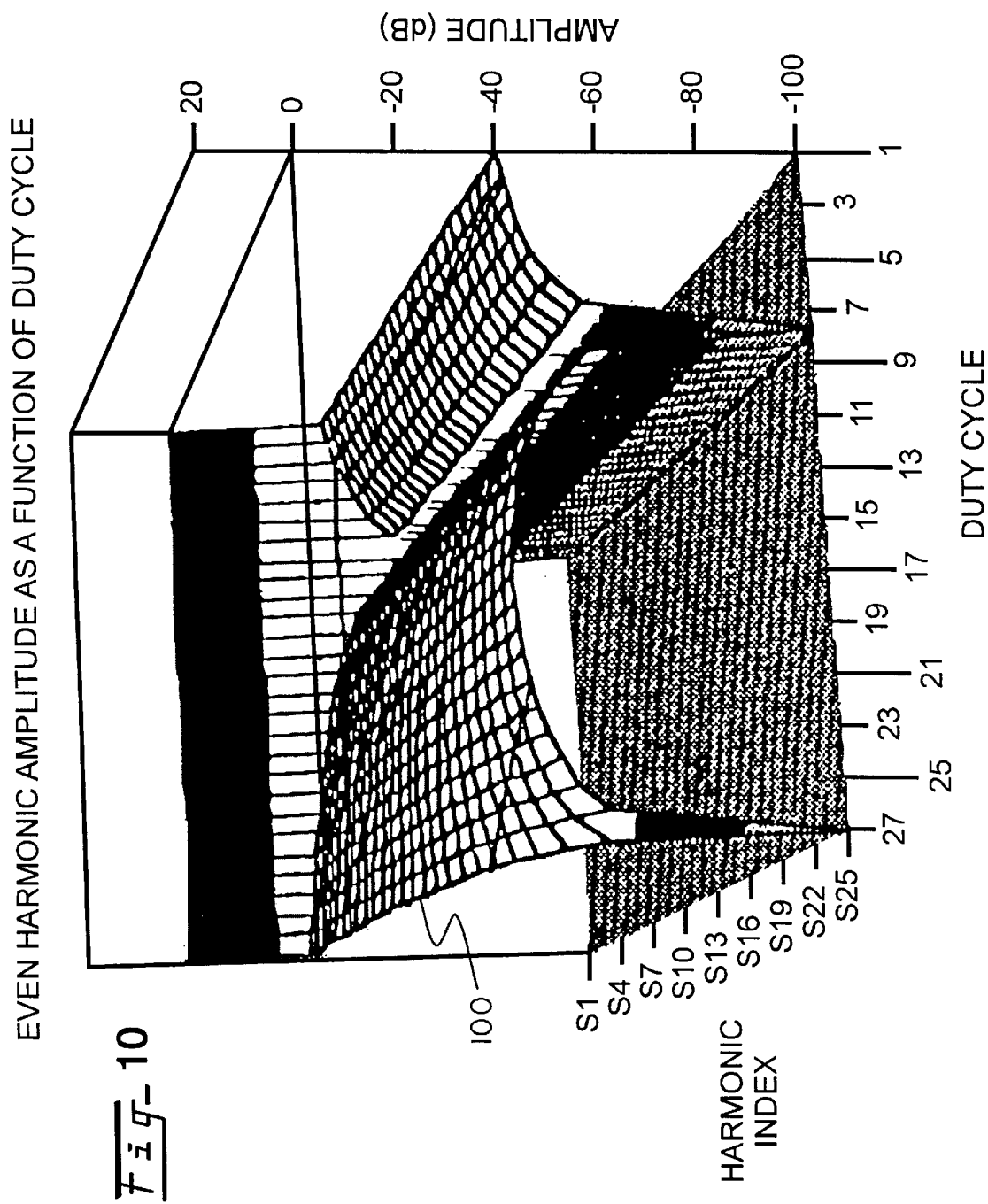
FIG. 10 shows a plot of the amplitudes of the even harmonics in decibels with indices from 2 through 50.

Refer now to FIG. 10 which shows the even harmonic amplitudes as a function of the duty cycle. FIG. 10 shows a plot 100 for the even harmonics with indices from 2 through 50. The even harmonics have zero amplitude at D=0.5. The harmonics rise as the duty cycle deviates from 0.5, falling again when the error causes a phase rotation in the sin[nπ (0.5+ε)] term of π. These are the nulls in the front corners of the plots.

The complimentary nature of FIGS. 9 and 10 illustrates the method of the invention to avoid the problem of nulls in the harmonics series. Wherever the odd harmonics drop toward zero, the nearby even harmonics are near full amplitude. The measurement instrument of FIG. 8 is programmed to use the odd harmonic or the even harmonic, whichever is larger, in a certain frequency range to test the system.

Figure 11:
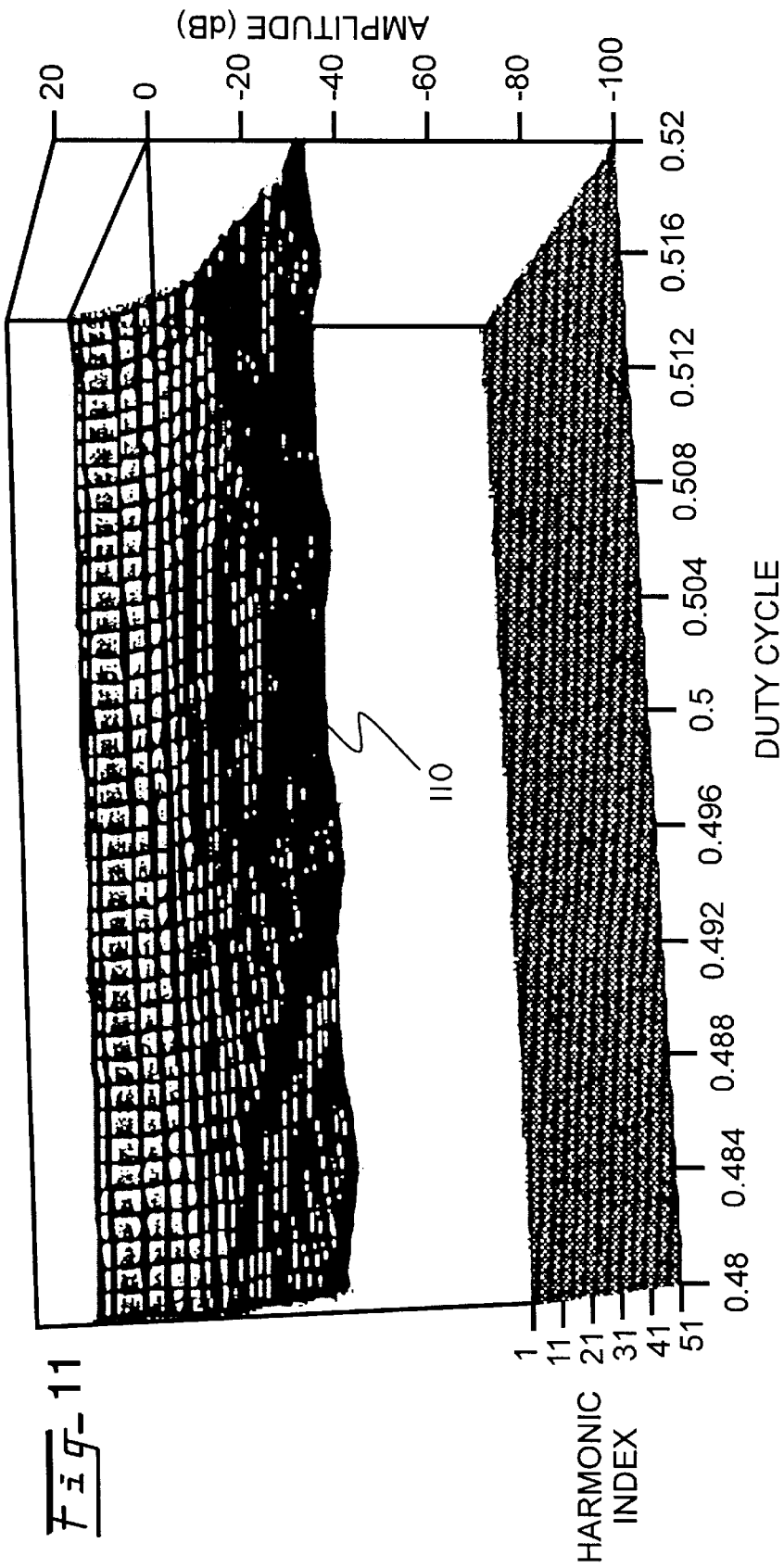
FIG. 11 shows the harmonic amplitudes obtained over the duty cycle range of 0.48 through 0.52 for the first 50 harmonics.

Now refer to FIG. 11 which shows the harmonic amplitudes 110 after choosing the larger values from the even and odd harmonic amplitudes. FIG. 11 shows the harmonic amplitudes obtained over the duty cycle range of 0.48 through 0.52 for the first 50 harmonics. The invention uses the larger of the even and odd harmonics, in a certain frequency range, to extend the usefulness of the duty cycle compensation method for frequency response measurements to a wider range of duty cycles for a given range of harmonics.

Figure 12:
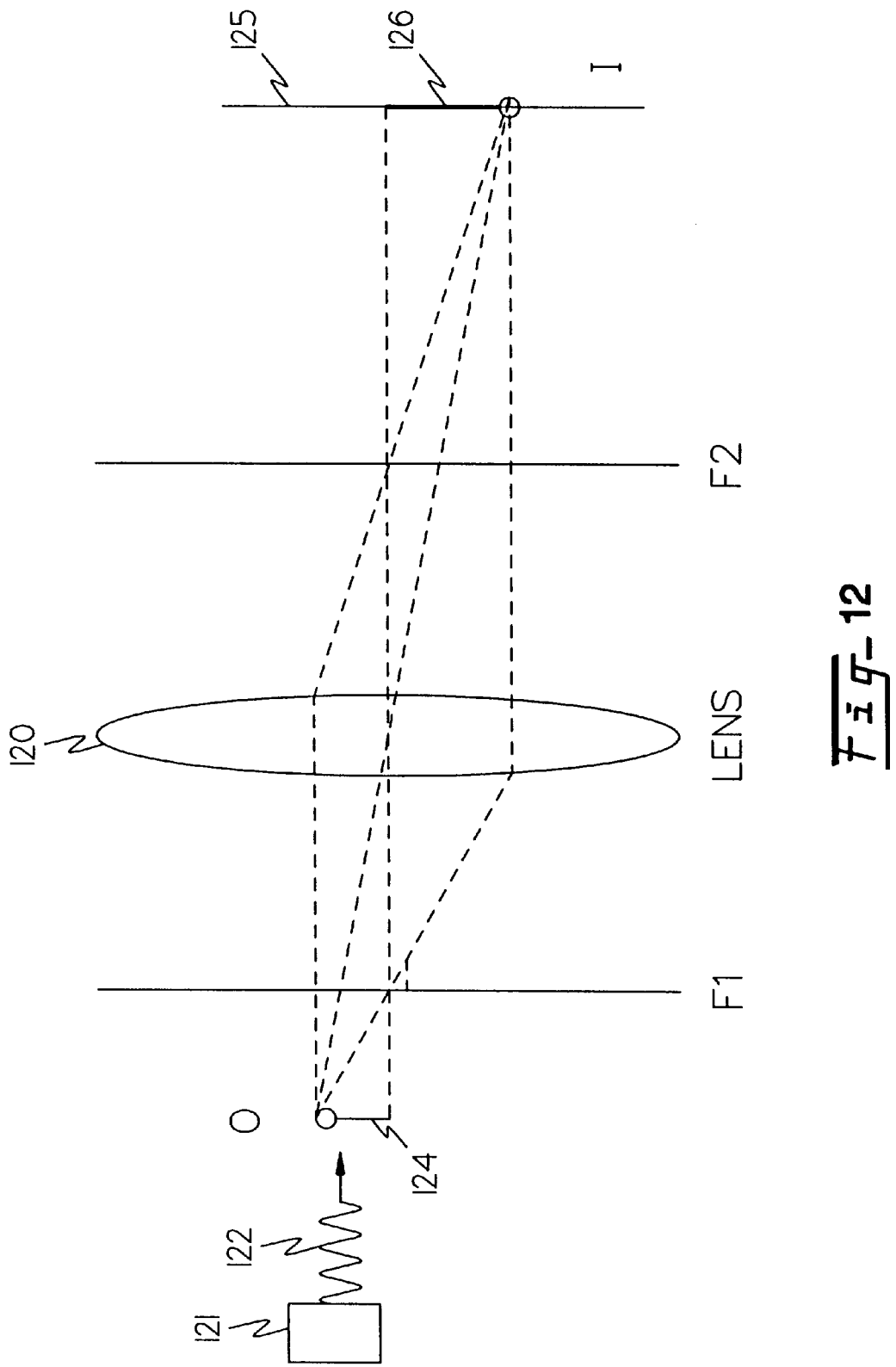
FIG. 12 shows an optical imaging system.

Refer now to FIG. 12 which shows image 126 formation with a biconvex lens 120. The duty cycle compensation method of the invention used to measure the STF of an optical imaging apparatus. In the general optical imaging system shown in FIG. 12, an object 124 comprises material that in some regions transmits light with little attenuation and in other regions is fully or partially opaque to light resides in the Object Plane, "O", and is illuminated from behind by a light source 121. An example of such an object 124 is an image transparency or a test pattern printed on a glass plate. A lens 120 creates a focused image 126 of the object 124 in the Image Plane, "I". A device 125 for detecting and possibly storing the image 126 is placed in the image plane. This device 125 may comprise a sheet of photographic film or an array of photosensitive detectors, for example. Taken together, the lens 120 and the detector device 125 may constitute a camera, the image formation portion of a microscope, or a telescope, for example.

Figure 13:
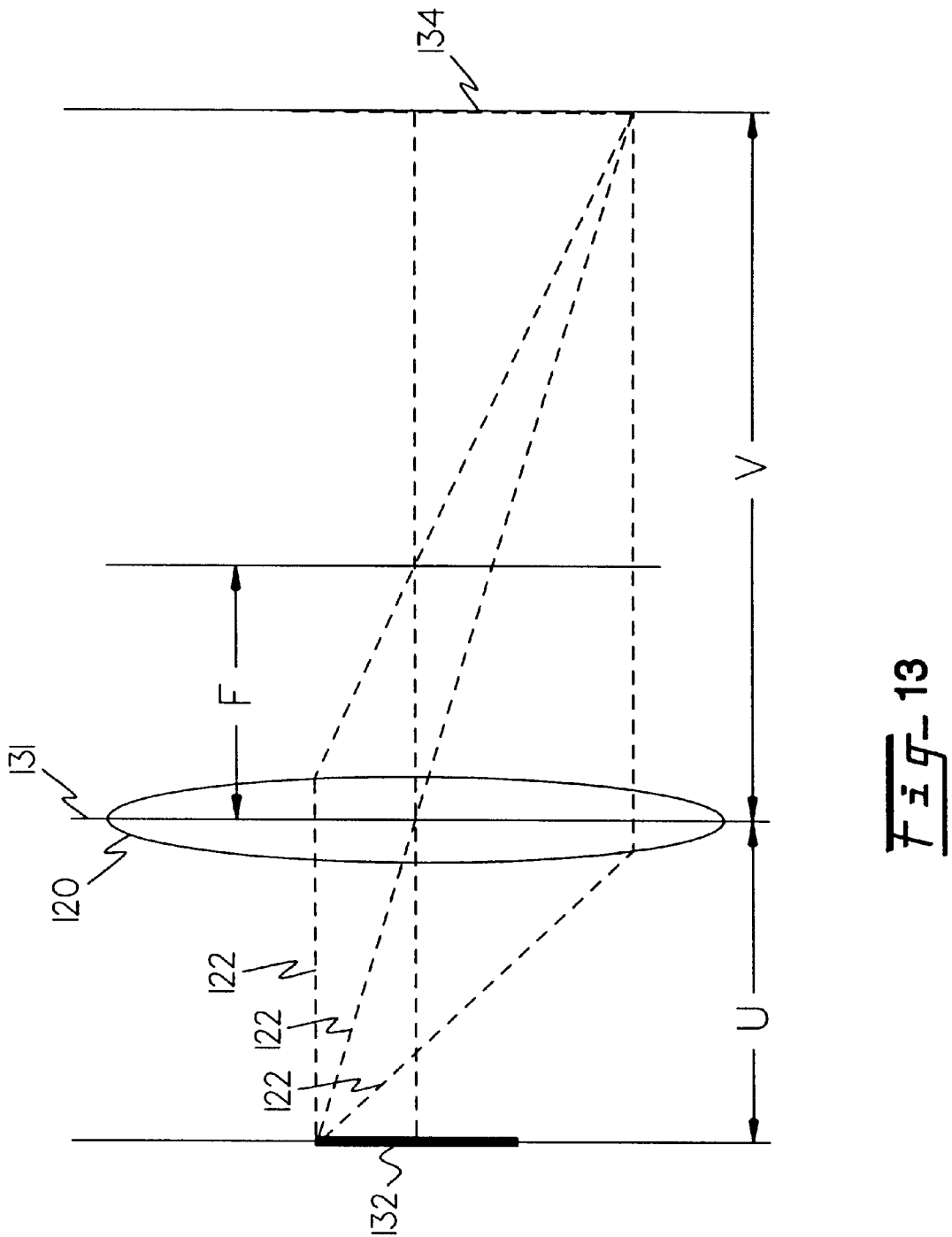
FIG. 13 shows the parameters of the lens equation for image formation.

Refer now to FIG. 13 which shows the parameters of the lens equation for image formation. The System Transfer Function measurement quantifies how well the spatial frequency components of the object 132 are preserved and aligned in the image 134. The object 132 modulates the light intensity with its pattern of varying transmissivity. Some of the modulated light 122 emerging from the object 124 reaches the lens 120 and is refracted toward the lens axis. Given that the shape of the lens 120 is such that any cone of rays emerging from a point in the object plane is focused to a point in the image plane, a high-quality reproduction of the details of the object 132 will appear in the image 134. The distance from the central plane 131 of the lens 120 to the Image Plane, which is the distance marked "V" in FIG. 13, depends on the focal length "F" of the lens and the distance from the object 132 to the lens central plane 131 "U" according to the imaging equation from geometric optics, as follows:

$$\frac{1}{F} = \frac{1}{U} + \frac{1}{V}$$

Because all physically realizable lenses have imperfections, and because the sharpness of the image is limited by the physical size of the lens and the wavelength of the light illuminating the object, some information existing in the object is lost in the imaging process. The STF, as measured by the MTF and the PTF, expresses the nature of this loss. The MTF is an expression of the loss of contrast as a function of spatial frequency, f. The PTF expresses the loss of alignment of object features as a function of spatial frequency, f. The STF is expressed as:

$$S(f) = M(f) e^{j\Theta(f)}$$

where:

$M(f) = MTF$ $\Theta(f) = PTF$

The spatial frequency, f, has the units of radians per unit distance. The spatial frequency, f, is not the spatial frequency or wavenumber, k, which is equal to $2\Lambda/\text{lambda}$, used in mathematical descriptions of wave propagation. Furthermore, in order to use the concept of spatial frequency in the system transfer function, it is necessary to accommodate the effect of magnification. If a periodic feature in the object has a spatial frequency of 100 radians/mm and the magnification of the imaging system is 10, then the same feature in the image will have a spatial frequency of 10 radians/mm. The magnification as a frequency scaling factor is included in the transfer function equations. However, a more attractive and intuitive approach is to reference spatial frequencies in object space. In making measurements on an aerial view of a city, for instance, it is more meaningful to reference city blocks per mile than city blocks per inch on the image.

Figure 14:
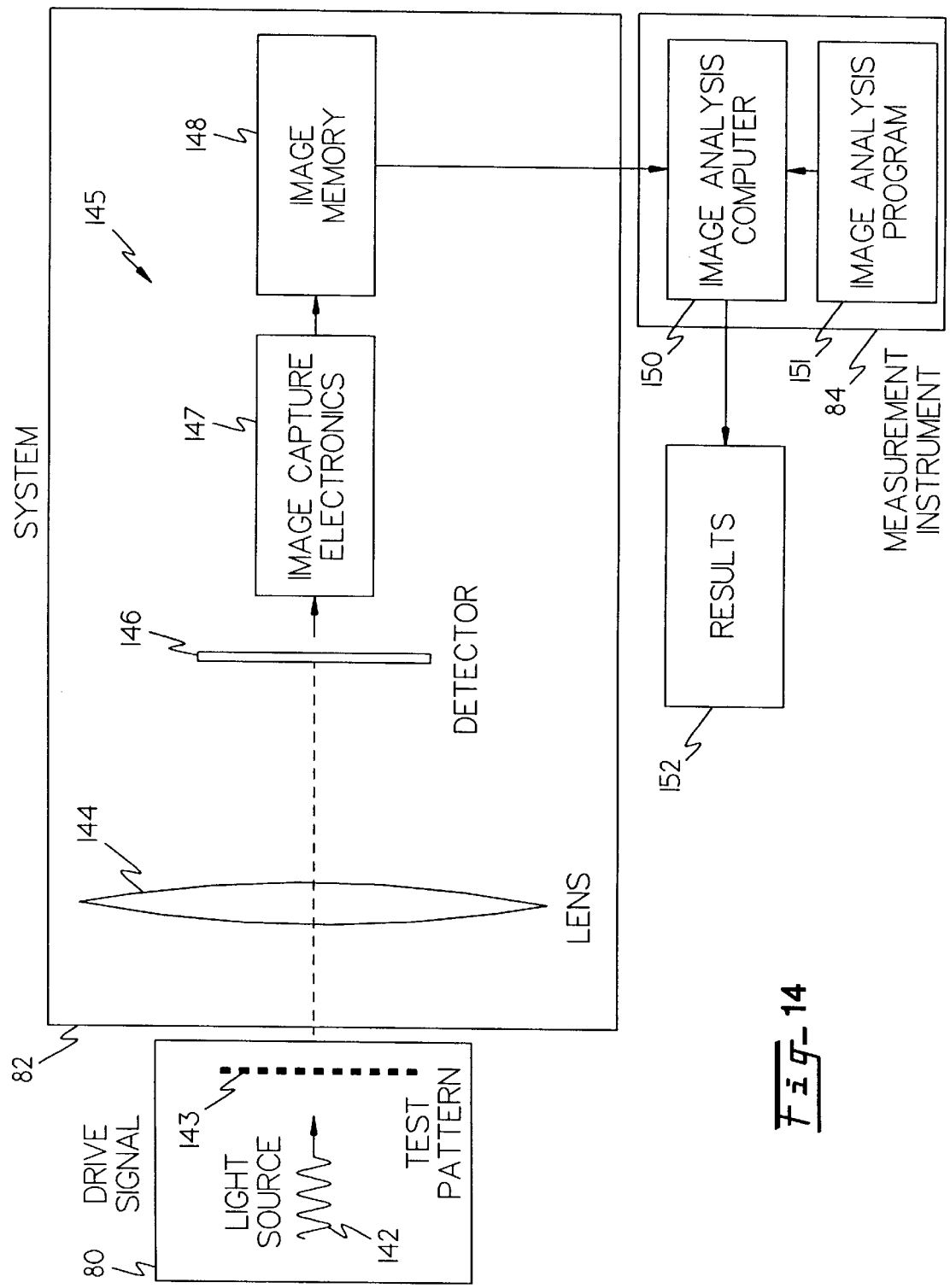
FIG. 14 shows a measurement method for an optical imaging system.

Now refer to FIG. 14 which shows the apparatus of the invention used to measure an optical imaging system. The generalized scheme for measuring the transfer function of a linear time invariant system depicted in FIG. 8 is applied to an optical imaging system by substituting a periodic test pattern 143 illuminated by light source 142 for the drive signal 80, a lens 144 and image capture system 145 for the system 82, and an image analysis computer 150 and program 151 for the measurement instrument 84 which outputs the results 152. This configuration is shown in FIG. 14. The first component of the image capture system 145 is a light detecting device 146 capable of delivering a voltage proportional to the intensity of light incident on its surface and spatially separating the arriving pattern by location on the surface. Orthocon and Vidicon video cameras and charge coupled device, (CCD) arrays are examples of such a device. The second component of the image capture system 145 is a circuit 147 for reading the signals from the detector 146, conditioning the signals if necessary using, for example, electronic filters or amplifiers, and delivering the signals to an image storage memory 148, and maintaining the correct spatial relationships of the features in the image. The third component of the image capture system 145 is the image memory 148, which is typically an electronic random access memory (RAM). Before the advent of dense, high-speed electronic memory integrated circuits, the image storage device might have been a cathode ray tube with a long-persistence phosphor.

The choice of a measurement system 84 for the optical imaging system 82 depends on the nature of the image memory. The many advantages of electronic memory, however, suggest that the measurement system 84 comprise a programmable processing unit, such as a microprocessor or a digital signal processor, capable of performing image analysis using mathematical operations invested in a computer program.

Figure 15:
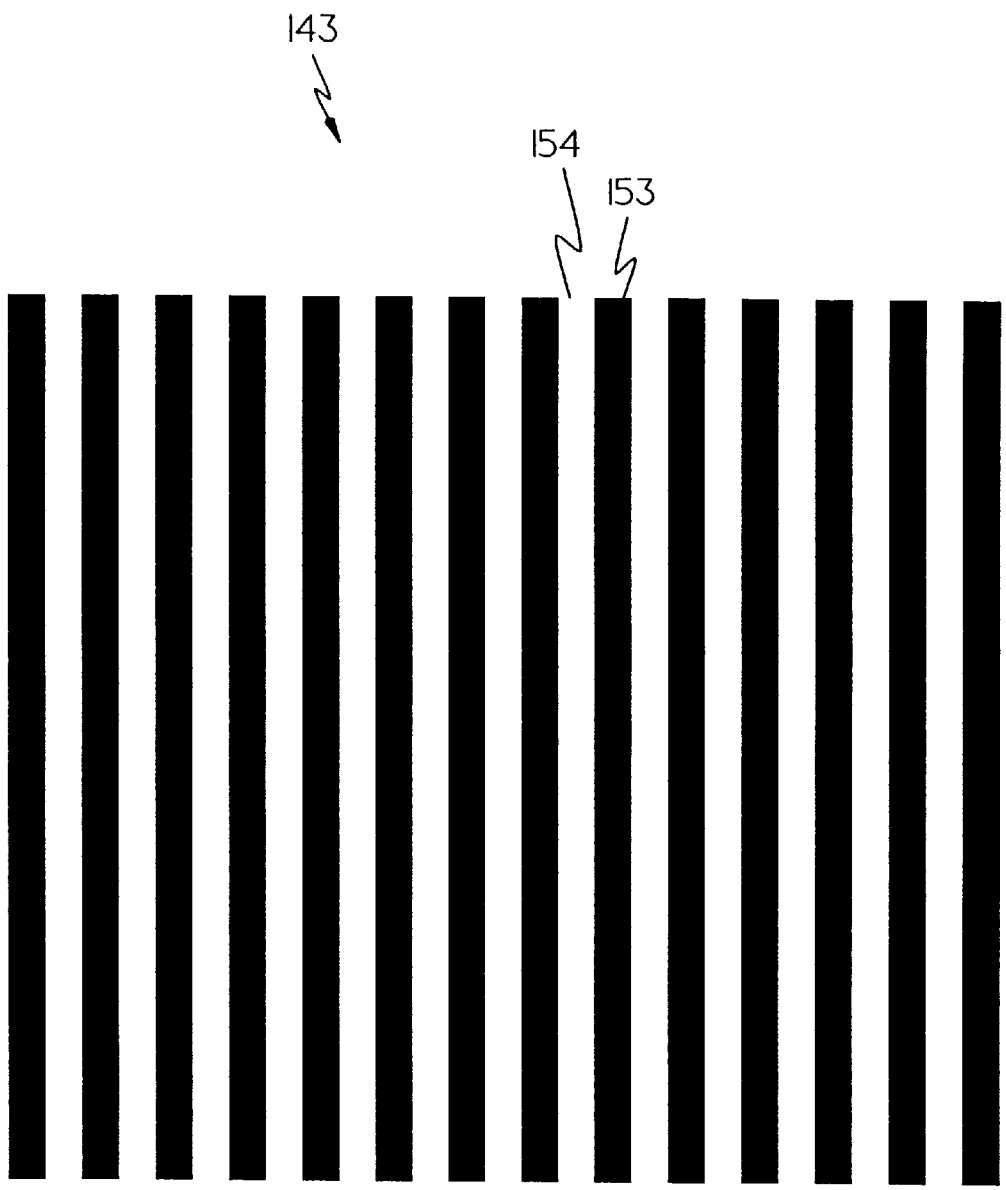
FIG. 15 shows a test pattern having alternating transmissive and opaque bars that is used for testing optical imaging systems.

Refer now to FIG. 15 which shows a test pattern of the invention. Just as the periodic square wave is a valuable test signal because of its rich harmonic content, a test pattern 143 comprised of alternating transmissive 154 and opaque 153 bars such as that shown in FIG. 15 is attractive for testing the optical imaging system. Furthermore, the measurement system 84 should perform spectrum analysis on the image of the bar pattern 143 to separate the harmonics and measure their amplitudes and phases. The Fast Fourier Transform is the computation method well known in the art for performing this spectrum analysis.

In direct analogy to the expressions for the amplitude and phase transfer functions of the general system, the optical imaging system transfer function is expressed as follows:

$$M(f) = \frac{A_{image}(f)}{A_{object}(f)}$$

and $$\Theta(f) = \phi_{image}(f) - \phi_{object}(f)$$

However, in the optical imaging system 82, the amplitudes of the harmonic components of the pattern in the object are meaningful only in the sense of the amplitudes of the harmonics relative to each other. The test pattern is fabricated to give the highest possible contrast between the opaque regions and the transmissive regions. The imaging system is designed to deliver a particular digitized output value for zero attenuation in the object, the output "white level", a value at the other end of the scale for zero transmission through the object, the output "black level", and intermediate output values on a scale that is linear with respect to intensity at the surface of the detector. This mapping of image intensity to a numerical output is called a "greyscale" when the signal is only proportional to a single quantity such as light intensity. An image quantified in this way is displayed on a black-and-white CRT. A multitude of scaling factors, such as the illuminating light intensity, the aperture size and magnification of the lens, the quantum efficiency of the detector, the gain of the signal conditioner, and conversion scaling of the analog-to-digital converter, determine the relationship between the output greyscale and the modulation performed by the object.

Figure 16:
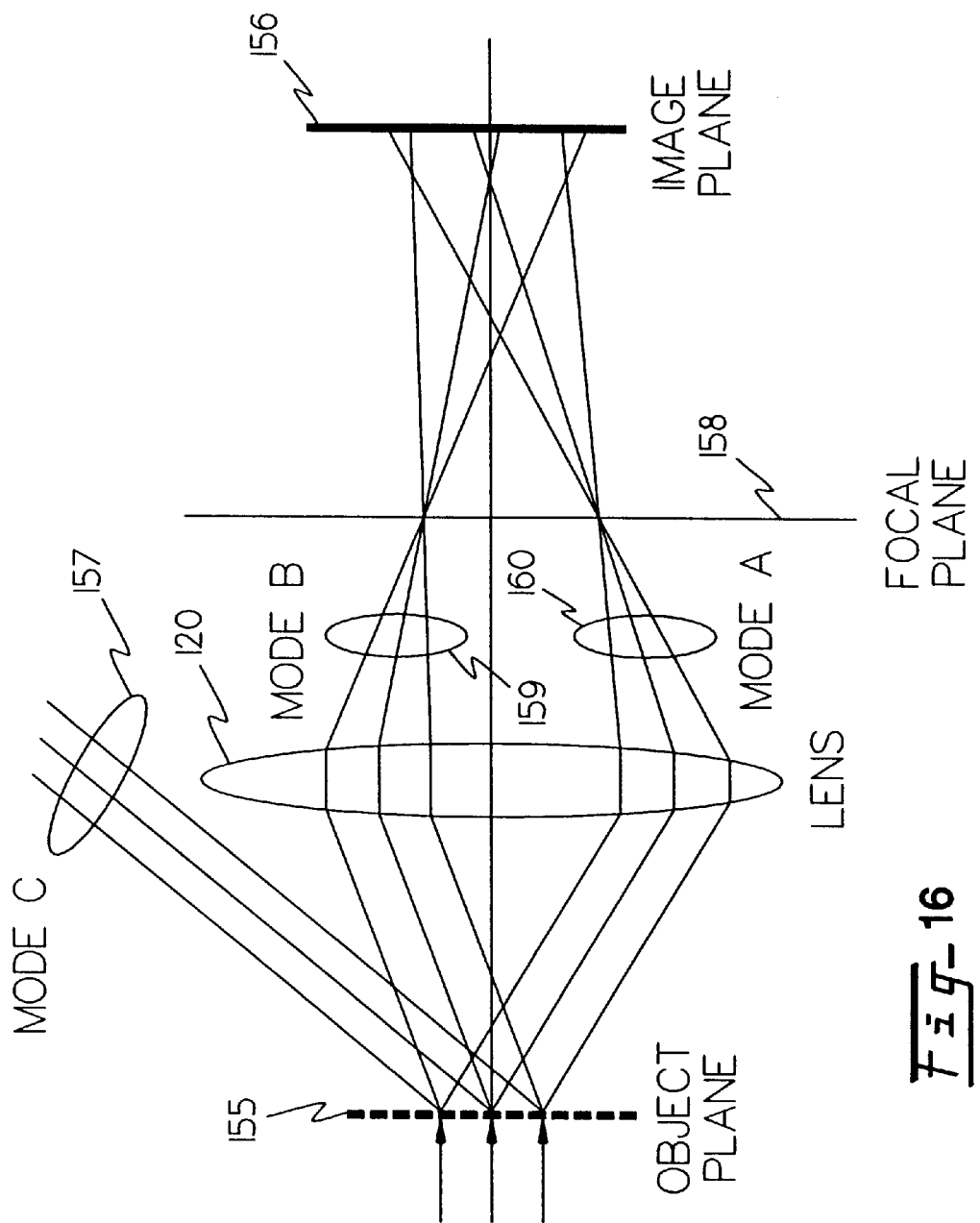
FIG. 16 shows a propagation mechanism.

Refer now to FIG. 16 which shows image formation as a double diffraction process. For the specific task of measuring the MTF, which is the amplitude frequency response of the imaging system, it is most convenient to analyze the image using the Fourier Transform method and to, first, normalize the harmonic amplitudes to the dc component of the spectrum. This dc or zero-frequency component represents the average brightness of the image 156. Next, the harmonic amplitude distribution attributable to the object pattern dimensions is removed from the spectrum of the image 156. The bar pattern of the object 155 is, in fact, a diffraction grating. It will transmit light toward the lens 120 in a diffraction pattern the shape of which is determined by the spacing and width of the transmissive bars. In direct analogy to the square wave signal, it will transmit only the even harmonics, called "modes" in diffraction theory, if the pattern conforms to a 50% duty cycle. Deviation from 50% will instill energy in the odd modes. This propagation mechanism is depicted in FIG. 16. This diagram shows representative rays for three modes. Any diffraction mode is accurately described by an infinite number of rays propagating at the angle of that mode. The small number of rays in the diagram, however, serves to illustrate the diffraction grating concept. Note that Mode A 160 and Mode B 159 fall within the acceptance angle of the lens 120 and, therefore, contribute information to the image. Mode C 157 propagates at such a steep angle that the lens 120 is unable to capture the light in that mode. The image spatial frequency cutoff of the optical imaging system is largely determined by the steepest angle captured by the lens 120. This cutoff frequency is called the diffraction limit of the optical system. Furthermore, because the various harmonics in the object pattern 155 correspond to the modes in the diffraction pattern, which in turn propagate through the lens 120 along different paths, deviation of the lens 120 from the ideal shape for focusing will cause the image 156 to fail to perfectly represent the object. The STF measurement, then, is useful for measuring the quality of the lens as well as the characteristics of the image capture system.

It is useful at this point to describe how the periodic pattern in the test object generates the diffraction pattern of light propagating toward the lens.

Figure 17:
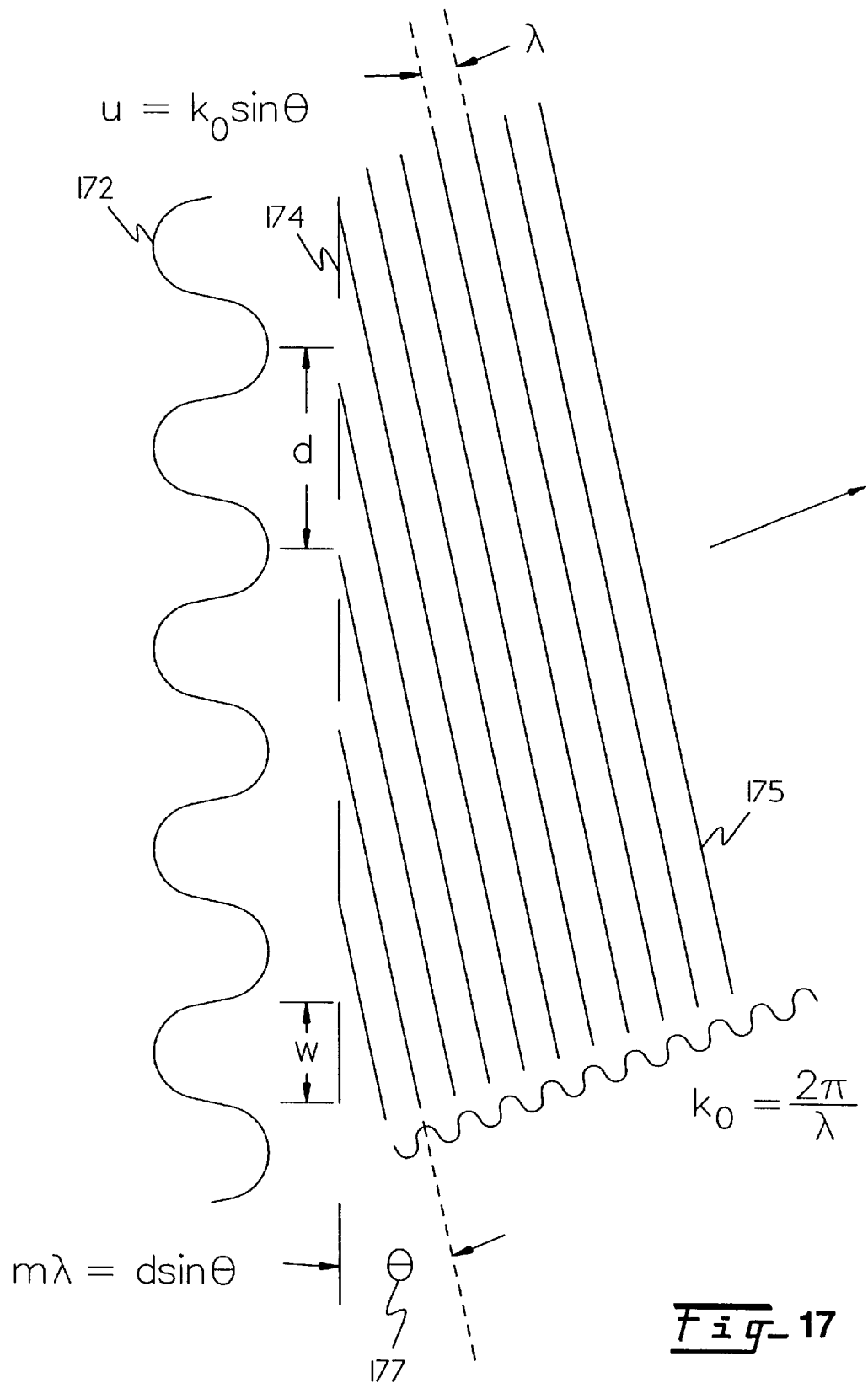
FIG. 17 shows parameters for diffraction theory.

Refer now to FIG. 17 which shows the parameters useful for diffraction theory. It is most convenient to describe the object as a collection of slits 174 of width "w" evenly spaced with distance between slits "d". In the nomenclature of the drive signal case, the duty cycle equals w/d. Treating each of the slits 174 as a radiating element, the diffraction pattern at a distance multiple wavelengths from the object in the plane perpendicular to the slits 174 is determined by the superposition of the light waves 175 emanating from the individual slits. The intensity at a certain angle relative to the object surface builds to a high value for constructive interference, that is, in-phase superposition of the waves. Nulls in the diffraction pattern appear at angles where destructive interference occurs. FIG. 17 illustrates how the spacing of the array dictates the angles of the lobes in the diffraction pattern. The wavefronts from two adjacent slits are in phase along a certain line of propagation when the path length difference is equal to an integer number of wavelengths. The equation for the angles of maximum intensity is as follows:

$$d \sin \theta = m\lambda$$

where:

$d$ = split spacing $\lambda$ = light wavelength $m$ = mode.

Note that for each positive-valued mode, m, there exists a conjugate mode, −m, with a phase angle −theta. Each spatial frequency component, u, in the object, then, is converted into a pair of propagation modes with angles dependent on the wavelength of light. The object will ordinarily comprise a collection of spatial frequency components, and the light source illuminating the object may have a spectrum spreading over a wide band of wavelengths. The diffraction pattern, then, is quite complex in most situations, but in a linear, isotropic medium, the equation above can be used to describe any of the diffraction modes.

The spacing of the slits does not fully dictate the diffraction pattern, however. The number of slits and the direction of the pattern of each slit are also influential in the determination of the diffraction pattern. Again considering the plane that includes the axis of the lens and that is perpendicular to the bars on the test pattern of the object, the individual slit diffraction patterns can be described in the spatial frequency domain by taking the Fourier Transform across the slit, as follows:

$$\Psi(u) = \int_{-w/2}^{w/2} e^{-jux} dx$$

where:

$$u = \frac{2\pi}{\lambda} \sin\theta$$

$w$ = slit width then:

$$\Psi(u) = w\text{sinc}\left(\frac{wu}{2}\right) = w\text{sinc}\left(\frac{\pi w \sin\theta}{\lambda}\right)$$

The slit diffraction pattern is better appreciated when expressed in terms of light intensity at each of the spatial frequencies, which is:

$$I(u) = |\Psi(u)|^2 = w^2 \text{sinc}^2\left(\frac{wu}{2}\right)$$
$$= w^2 \text{sinc}^2\left(\frac{wk\sin\theta}{2}\right)$$
$$= w^2 \text{sinc}^2\left(\frac{\pi w \sin\theta}{\lambda}\right)$$

The sinc function goes to zero when the numerator of the argument equals an integer multiple of π. The angles of the nulls in the slit diffraction pattern, then, reside at angles predicted by the following relation:

$$\frac{\pi w \sin\theta}{\lambda} = m\pi$$

and $$\theta = \arcsin m \frac{\lambda}{w}$$

The method of the invention provides expressions for the angles at which diffraction peaks occur for the whole array of slits and for the angles at which diffraction nulls occur for the individual slits. The array diffraction pattern is composed of a collection of modes, each mode corresponding to a harmonic of the fundamental frequency of the object pattern. Modes existing at the angles of the slit diffraction nulls will carry no energy. This is the case for the even numbered modes when the duty cycle, w/d, equals 0.5, as evidenced in the following equations:

$$\frac{n\lambda}{d} = \sin\Theta = \frac{m\lambda}{w} = \frac{2m\lambda}{d}$$

that is:

$$n = 2m$$

As the duty cycle deviates from 0.5, the simple integer relationship between n and m fails and energy appears in the even modes as well as the odd. This effect is analogous to the redistribution of energy in the harmonics of the drive signal treated in the general case.

Each mode of the diffraction grating can comprise a plane wave. The imaging lens causes each of these plane waves to converge to a point in the focal plane 158 as shown in FIG. 16. The collection of points in the focal plane, when characterized by both amplitude and phase, constitute the Fourier Transform of the object. Each point acts as a point source, and the superposition of the spherical waves from these point sources in the image plane creates the image of the diffraction grating.

Each pair of point sources in the diffraction pattern carries the information from one mode of the diffraction grating. The spatial frequency component of this mode in the image is a sinusoid and the phase of the sinusoid is determined by the relative phase between the two sources. The relative phase between the two point sources is determined by the vertical offset of the diffraction grating with respect to the principle axis of the lens. This is the linear phase term in the Fourier Transform.

Figure 18:
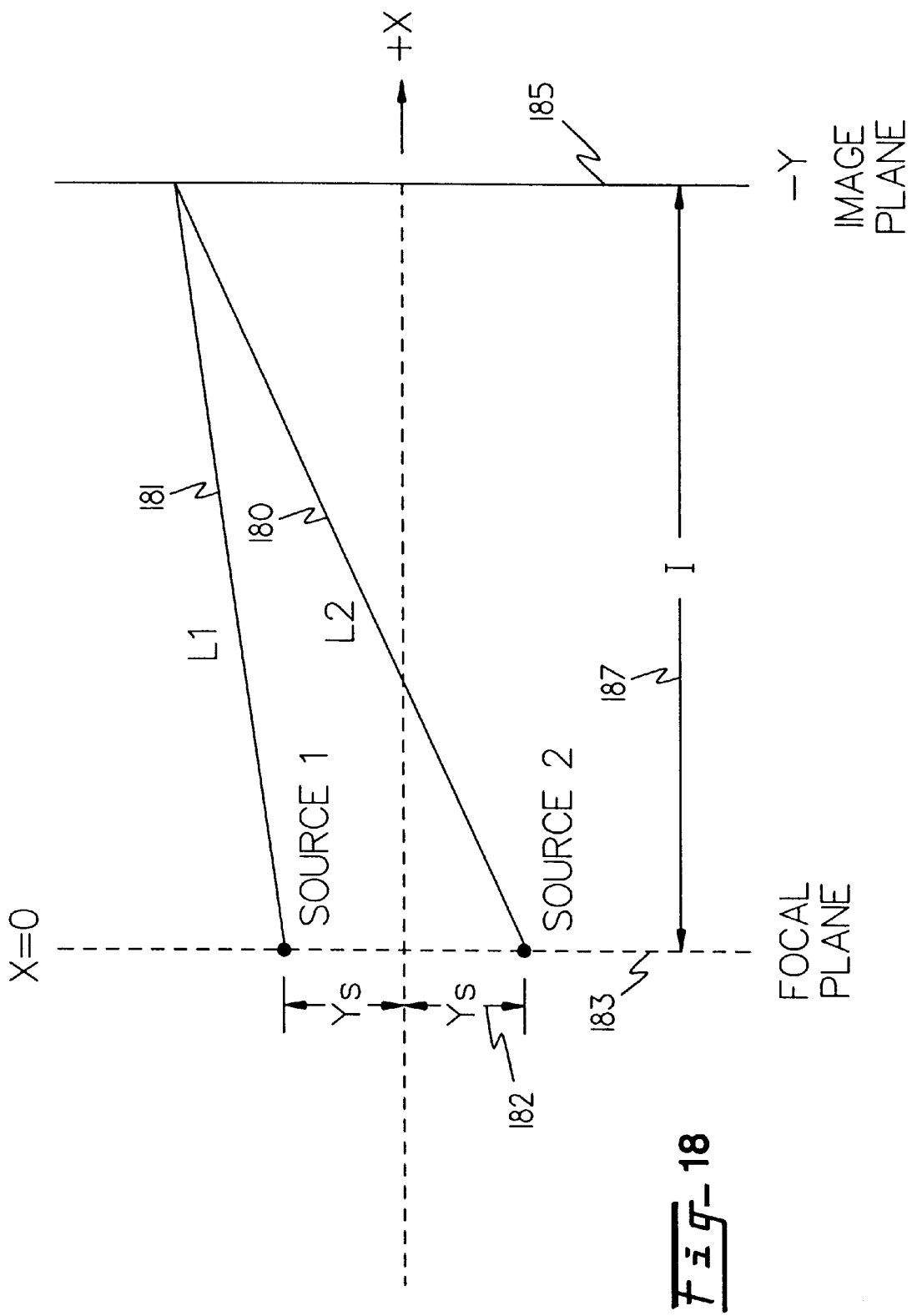
FIG. 18 illustrates the geometry used in a calculation of the amplitude of the illumination in the image plane by the superposition of the two sources.

Refer now to FIG. 18 which shows the geometry for a two source interference computation. FIG. 18 illustrates the geometry used in a calculation of the amplitude of the illumination in the image plane by the superposition of the two sources. The difference in length between paths 180 and 181, which is L2-L1, for each point (I,y) in the image plane 185 and the phase difference between the sources determines the amplitude of the illumination at that point. The distance between the focal plane 183 and the image plane 185 equals I 187. Note that the distances Ys 182, L1 181, and L2 180 are all expressed in units of wavelength in the following equations:

$$L1 = \sqrt{I^2 + (y - Y_S)^2}$$

and $$L2 = \sqrt{I^2 + (y + Y_S)^2}$$

Figure 19:
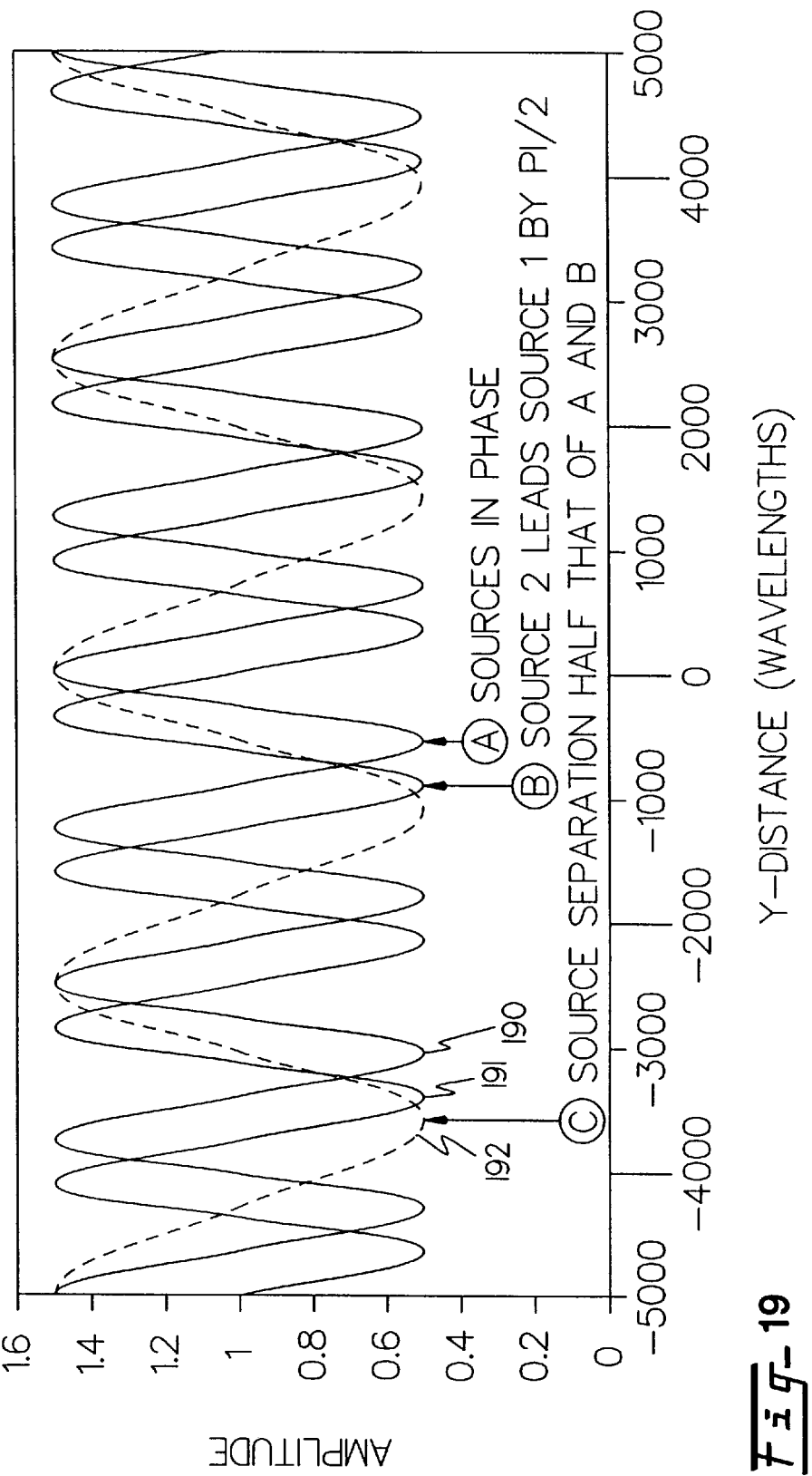
FIG. 19 shows the cosine of the phase difference of the two sources at each point, y, in the image plane with a constant added to represent the zero-order mode of the diffraction pattern.

Refer now to FIG. 19 which shows the image spatial frequency components from two-source interference. FIG. 19 shows the cosine of the phase difference of the two sources at each point, y, in the image plane with a constant added to represent the zero-order mode of the diffraction pattern. This is the real part of the interference pattern, which is computed as follows:

$$Re\Psi(y) = A_O + A_S \cos[\phi_2 - \phi_1 2\pi(L2-L1)]$$

Cases A 190 and B 191 illustrate that a shift in the object in the vertical direction results in a phase shift between the sources for the mode in question, which, in turn, creates a vertical shift in the image component for that mode. In Case C 192, the two sources are in phase, but separated by half the distance as in Cases A 190 and B 191. The diffraction components corresponding to the modes of the diffraction grating are distributed at regular intervals in the vertical axis of the focus plane. The frequency scaling seen in FIG. 19 Case C 192 is the mechanism that translates the diffraction pattern into the set of harmonics that sum to create the bar pattern image. The light intensity generated at the image plane by the combination of all of the sources in the diffraction pattern is the square of the magnitude of the illumination, as follows:

$$I(y) = A_0^2 + \sum_{n=-N}^{N} M^2 [Re\Psi_n(y), Im\Psi_n(y)]$$

where:

N = number of modes $$M(X) = \sqrt{(Re X)^2 + (Im X)^2}$$

Taken together, the point sources create an interference pattern in the image plane that is a scaled, inverted replica of the object. If the measurement instrument is a Fourier Transform spectrum analyzer, then the amplitude and phase of each of the point sources is retrieved, except for modifications in amplitude and phase introduced by the image capture electronics.

Figure 20:
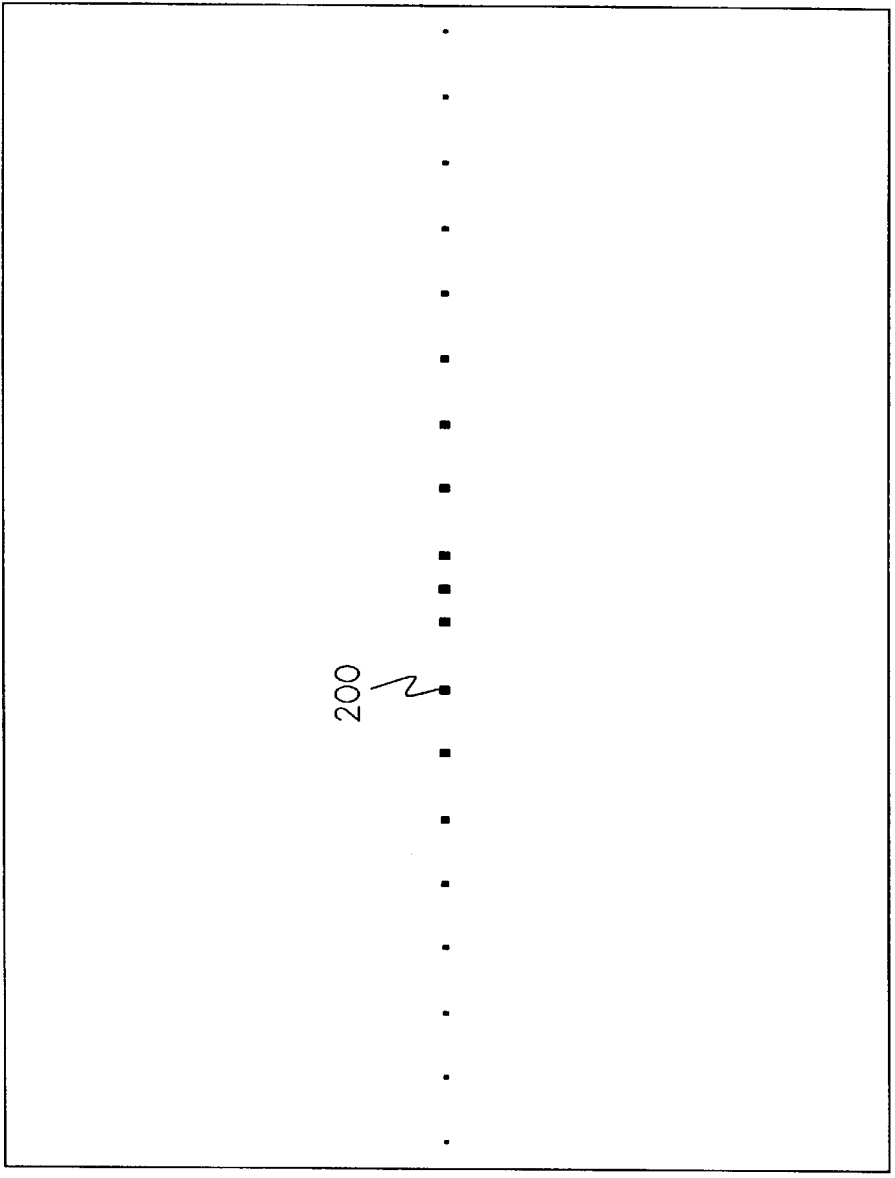
FIG. 20 shows a spectrum of a vertical bar pattern as a horizontal row of dots.

Now refer to FIG. 20 which shows the spectrum of the vertical bar pattern. The Fourier Transform of a two-dimensional image is a pattern of harmonics in two-dimensional frequency space. As shown in FIG. 20, the spectrum of the vertical bar pattern is a horizontal row of dots 200. If there were an infinite number of cycles in the bar pattern, each dot has zero diameter. For a finite pattern length, however, the boundaries of the pattern constitute a rectangular aperture, the Fourier Transform of which is a sinc function. Each of the measured harmonics, then, is convolved with the sinc function to create a collection of sidelobes arrayed horizontally around the central lobe of the harmonic. The spectrum of FIG. 20 was obtained from a Fourier Transform of the bar pattern image using a windowing function to attenuate the edges of the image. The windowing function was chosen to have a Fourier Transform with low sidelobes.

The bar pattern object can be treated in a manner identical to the square wave drive signal of the initial harmonic analysis, and the correction for the bar pattern duty cycle is applied equally well to the Fourier Transform of the image. The System Transfer Function, when properly adjusted for the actual amplitudes of the spatial frequencies in the object, will express the modulation and phase rotation of the combination of the optical and the electronic components of the imaging system.

Frost et al. shows a method and apparatus for measuring the amplitude and phase of each of the harmonic components of a bar pattern image. Those skilled in the art will recognize that other methods of measuring the amplitude and phase of each of the harmonic components of a bar pattern image will benefit from the methods of the invention. The invention improves the accuracy of such measurement methods by correcting for the change of harmonic amplitudes resulting from the deviation of the test pattern duty cycle from the ideal value of 0.50.

Returning to the optical imaging system transfer function measurement apparatus of FIG. 14, the measurement system, which operates by calculating a Fast Fourier Transform on the stored image, is used to characterize the lens 144, the detector 146, and the image capture electronics 147. The FFT result is compensated to remove the fall-off of the amplitudes of the modes of the diffraction pattern to yield the system MTF. The method of this invention accommodates an arbitrary value of duty cycle.

The image capture system depicted in FIG. 14 will convert the image projected onto the face of the detector 146 into an array of greyscale values stored in the image memory. If the lens is of high quality, the detector is placed at the distance of best focus from the lens, and the image capture electronics is linear and free of noise, the stored image is a good replica of the object. The opaque bars will appear at is the black level, a1, the transmissive bars will appear at the white level, a2, and the duty cycle of the image will be, D, equal to the duty cycle of the object. The stored image average level is a1+(a2−a1)D.

A useful representation of the system MTF is computed from the FFT output spectrum, A(f) by dividing each of the harmonics by the average gray level for normalization, and by compensating for the amplitude distribution of the diffraction modes of the target, as follows, $$MTF(n) = \frac{A_{out}(n)}{A_{out}(0)} \left| \frac{1}{\text{sinc}(n\pi D)} \right|$$

$$= \frac{A_{out}(n)}{A_{out}(0)} \left| \frac{n\pi D}{\sin(n\pi D)} \right|$$

For duty cycles very close to 0.5, only the fundamental frequency (n=1) and the odd harmonics (n=3,5,7, . . . ) are useful for the measurements. As the duty cycle deviates greatly from 0.5, the method described for the general case that uses either the odd harmonics or the even harmonics, whichever carry more energy, residing in a frequency range of interest, is used in the measurement to maintain signal to noise ratio.

The accuracy of the duty cycle compensation method is highly dependent on the accuracy of a measurement of the actual test pattern duty cycle. Referring to FIG. 1, what is required is a precise measurement of the period, T, and the pulse width, W. If the test pattern is an electronic signal, a voltage comparator and timer is used to time the intervals between adjacent rising edges to measure the period between the rising and falling edges of the pulse to measure the pulse width. A voltage threshold is set for the comparator halfway between the upper and lower states of the waveform. If the test pattern is an optical diffraction grating, an image of the grating is captured and analyzed with a computer. A mathematical operation equivalent to the comparator/timer method of the electronic signal case is used.

Figure 21:
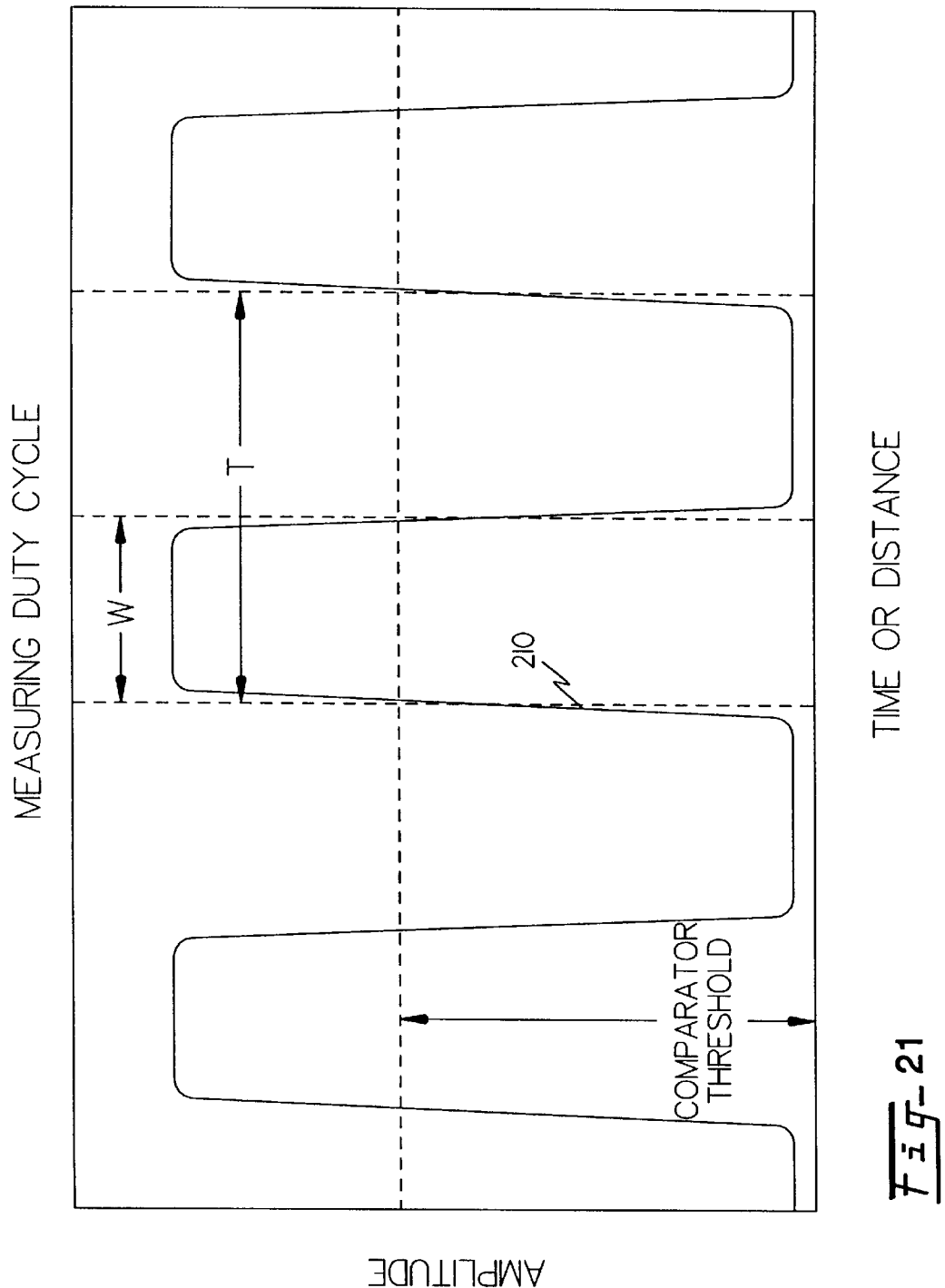
FIG. 21 parameters used for the measurement of duty cycle.

Refer now to FIG. 21 which show parameters relating to the measurement of duty cycle. Difficulties arise when a combination of nonlinearity, hysteresis, and limited bandwidth in the measurement system 84 distort the edges of the pulse 210. The transition between states in this case requires some time, and the shape of the waveform presents an uncertainty in the choice of a comparator threshold. This situation is shown in FIG. 21.

It is clear that the duty cycle value is a function of the threshold level under these circumstances.

Spectrum analysis provides a convenient solution to this quandary. This method assumes that the test pattern generator duty cycle is adjustable or, in the optical case, that there is some control of the duty cycle possible in the fabrication of the diffraction gratings. Referring to FIG. 8, the system 82 is replaced by an apparatus to capture the waveform or the image of the diffraction grating. The measurement instrument 84 is a spectrum analyzer. When the duty cycle of the drive signal or diffraction grating is exactly 50%, the sum of the even harmonics reported by the spectrum analyzer will reach a minimum. Ideally, the even harmonic sum will equal zero. This provides a calibration for the comparator/timer apparatus. The threshold value is adjusted for the signal or diffraction grating proven by spectrum analysis to have a 50% duty cycle. With the threshold properly adjusted, the comparator/timer will report a 50% duty cycle. It can then be applied to other signals or diffraction gratings using this calibrated threshold and will accurately report the duty cycles of those articles, given that the waveform distorting properties and the threshold setting of the measurement system are stable.

Figure 22:
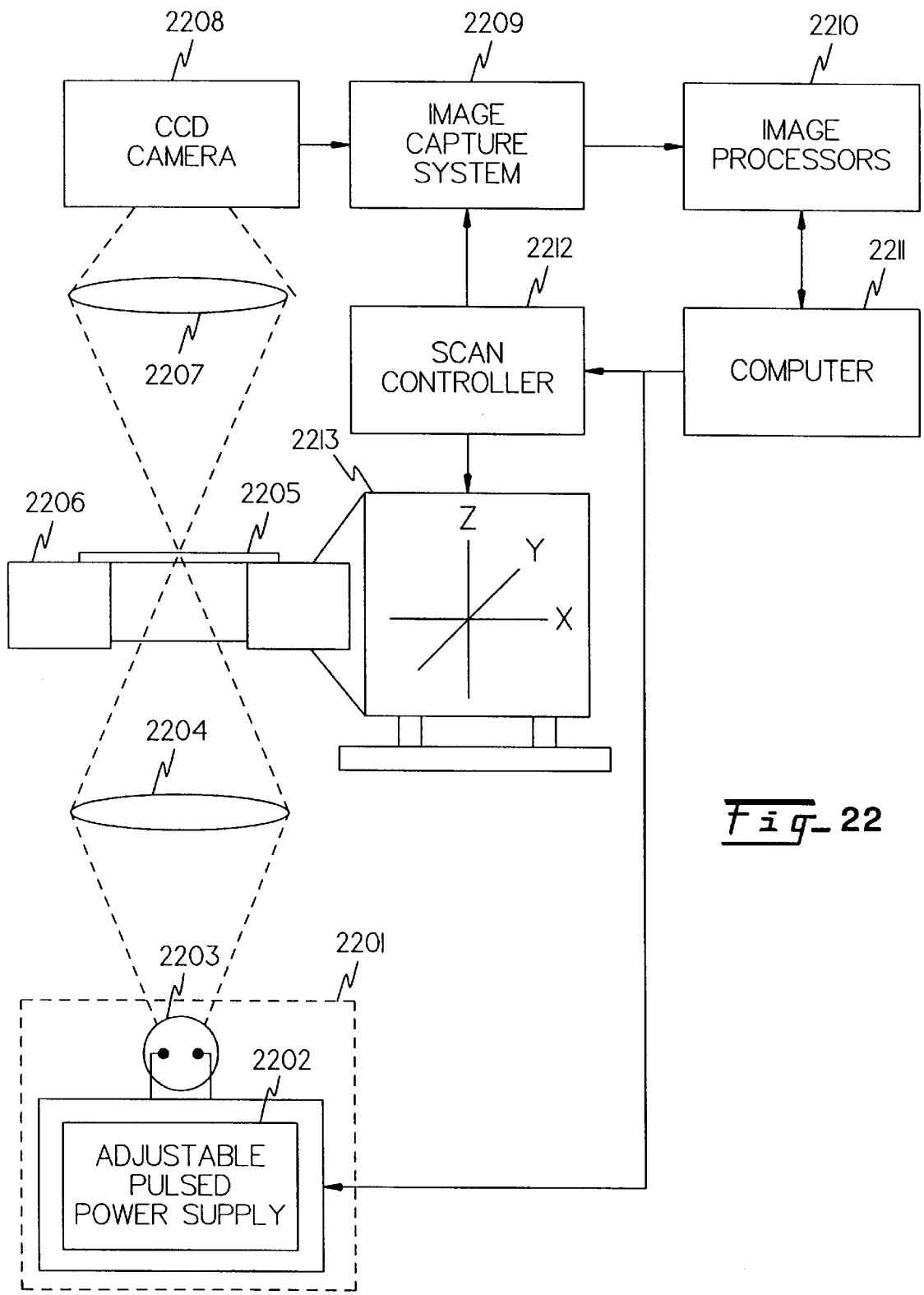
FIG. 22 shows a block diagram of an automated microscope apparatus, the modulation transfer function of which is measured with high accuracy using the method of this invention.

Refer now to FIG. 22 which shows an automated microscope to which the method of the invention is applied. The optical components of the system are an electronically controlled, strobed light source 2201 that provides for illumination and is comprised of an adjustable pulsed power supply 2202 and an arc lamp 2203. The light is focused by condenser 2204 on the resolution target 2205, which is mounted on the movable stage 2206. The objective 2207 forms an image of the illuminated target 2205 on the face of the charge coupled device camera 2208, which converts the image into an electronic signal that is processed by the image capture system 2209. The electronic signal from camera 2208 is comprised of a time sequence of analog linescan signals. Each linescan signal is constructed from the voltages presented by the CCD cells in a single row of the array. The image capture system amplifies the signals, applies adjustments in gain and offset to improve the brightness uniformity of the captured image, and converts the analog signals into streams of digital samples. One complete scan of the CCD camera array generates a set of digital scan lines that comprise a single image of the resolution target. These images are transferred to the image processors 2210, which execute the Fast Fourier Transform step of the modulation transfer function computation. The FFT results are further processed by the central processing unit 2211 to generate the modulation transfer function results. The CPU 2211 also controls the operation of the stage motion drivers 2213 and the image capture system 2209 by sending commands to the scan controller 2212. The CPU 2211 also controls the timing and the amplitude of the light source strobes by sending commands to the strobed power supply 2202. One image of the resolution target is captured and processed for every firing of the light source.

Figure 23:
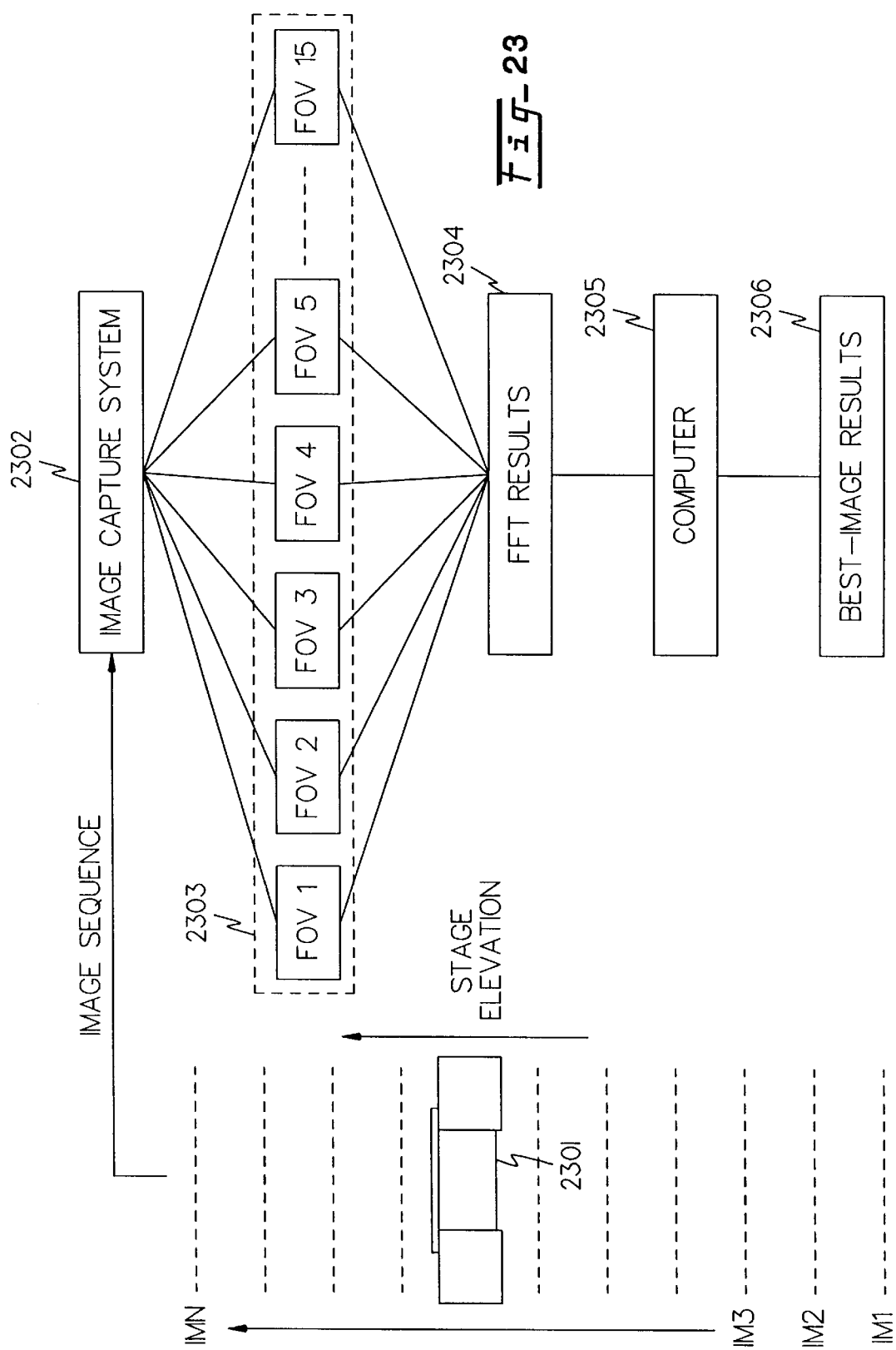
FIG. 23 shows a flow chart illustrating the use of the components of the apparatus in the computation of the modulation transfer function.

FIG. 23 is a block diagram showing the use of the multiple image processors for computing the modulation transfer function. It is of most interest to measure the MTF with the resolution target in focus. Errors in focusing, that is, in the setting of the stage elevation, reduce the high frequency content in the image so that the MTF does not reflect the best available performance of the imaging system. In order to overcome this problem, images are collected from multiple settings of the elevation of the stage 2301. The image capture system 2302 processes and converts each image and stores it in a local memory. The CPU 2305 coordinates the transfer of images to the Field of View Processors 2303, identifying the next available processor as the image is presented for transfer. The image capture sequence and stage motion is suspended if all processors are busy and will resume as processors complete their computation tasks and become available.

The Fast Fourier Transform calculations are the most computationally intensive of the MTF tasks and are, therefore, relegated to the FOV processors 2203. The FFT results 2304 are transferred to the CPU 2305. For each of the data sets, each set consisting of the amplitudes and phases of the harmonics computed for a single image, the CPU 2305 computes the sum of the amplitudes of the odd harmonics from the fundamental to the highest harmonic below the Nyquist limit. Comparing the sums of odd harmonics from the images in the scan sequence, the CPU 2305 selects the image with the highest sum. The CPU 2305 conveys the results for that image as the test outcome 2306.

Figure 24:
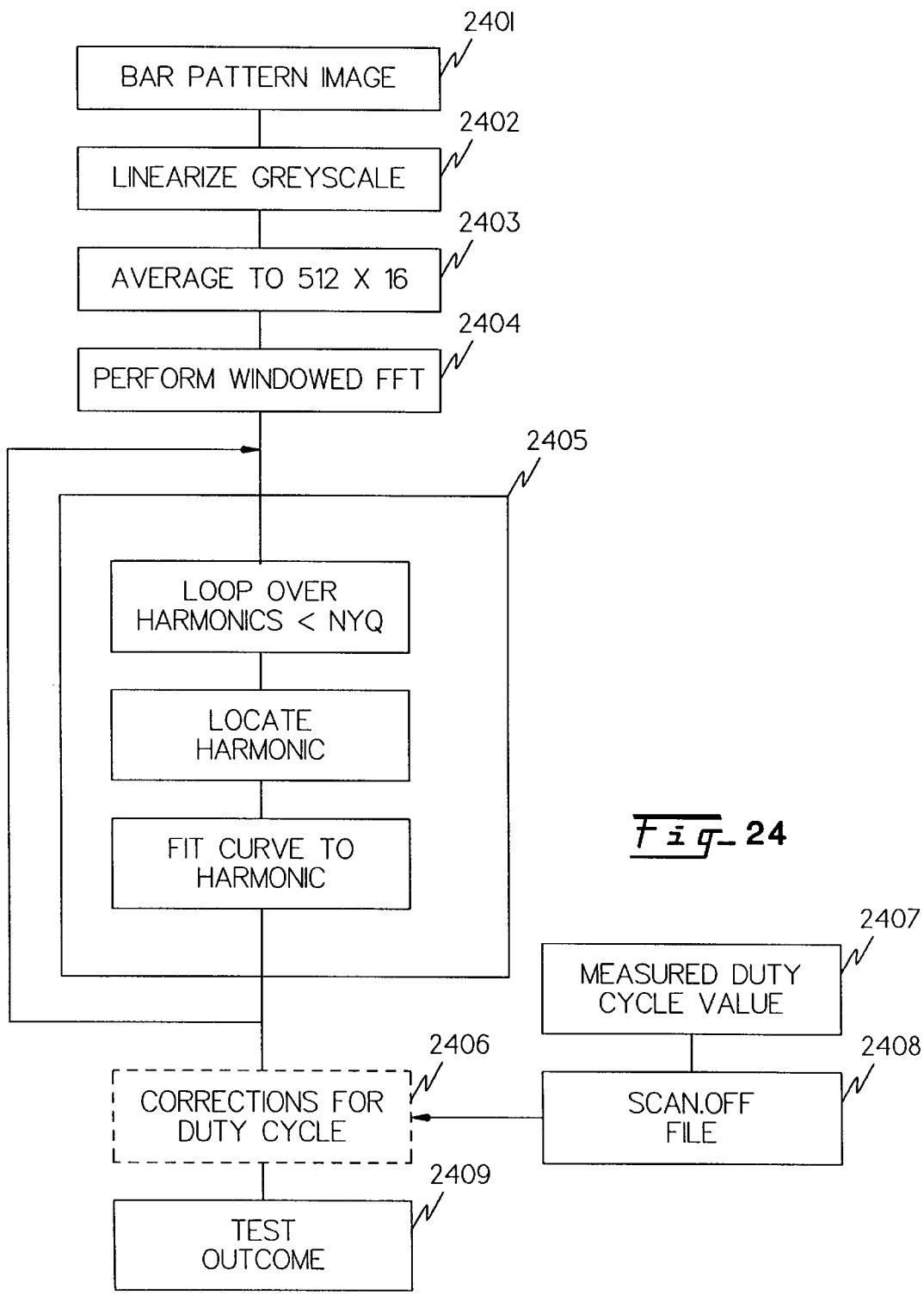
FIG. 24 shows a flow chart of the modulation transfer function computations.

FIG. 24 is a flow chart of the MTF computation routine. A complete description of these computations, except for the duty cycle compensation, is disclosed in Frost, et al. The bar pattern image 2401 is comprised of a 512 by 512 pixel array of integer greyscale values, ranging from 0 to 255. Because the amplitude transfer function of the CCD camera is somewhat nonlinear, a first step in the computation is that of decompressing the greyscale, step 2402. This is done by applying a polynomial equation and converting the integer greyscale values into floating point numbers. In step 2403, the image is reduced from its initial dimensions of 512 by 512 to 512 by 16. For vertical bar patterns, adjacent rows in each 32-row region are averaged to form a single row. For horizontal bar patterns, adjacent columns in each 32-column region are averaged to form a single column. This step is executed to reduce the FFT computation time. Little information loss is incurred because of the very low frequency content in the direction parallel to the bars. This frequency content is zero except for the slight rotation introduced into the test patterns to reduce aliasing, as described in Frost et al.

In step 2404, a two dimensional Fast Fourier Transform is computed for the reduced-area image. An apodization (windowing) function is applied to reduce crosstalk between frequency bins. This is a fourth-power of the cosine apodization function. In step 2405, the amplitude and phase for each of the harmonics is extracted from the two-dimensional spectrum of the image produced by the FFT 2404. Specialized curve fitting is applied in the complex number system to yield the best approximation to the amplitude and phase values.

In step 2406 the amplitude values of the odd harmonics are adjusted to correct for the error in resolution target duty cycle, as expressed in the following equation:

$$MTF(n) = \frac{A_{OUT}(n)}{A_{OUT}(0)} \left| \frac{1}{\text{sinc}(n\pi D)} \right|$$
$$= \frac{A_{OUT}(n)}{A_{OUT}(0)} \left| \frac{n\pi D}{\sin(n\pi D)} \right|$$

where:

-continued $A_{OUT}(0)$ = image average value $A_{OUT}(n)$ = amplitude of the nth harmonic $n$ = harmonic index (odd)

$D$ = duty cycle

The duty cycle, D, is measured in step 2407 on a specialized microscope referred to as the "Metrology Station". The duty cycle of the 50 linepair/mm horizontal and vertical bar patterns are measured and recorded before the resolution target 2502 is mounted on the imaging system. These duty cycle values are written into the "scan.off" file 2408 which is a file stored in memory accessible to the CPU 2305. This file contains values for a number of parameters unique to the particular imaging system. After application of the correction equation in step 2406, the test outcome 2409 is written to a file that holds the results from an ensemble of tests. This file is saved as a record of the performance of the imaging system.

Figure 25A:
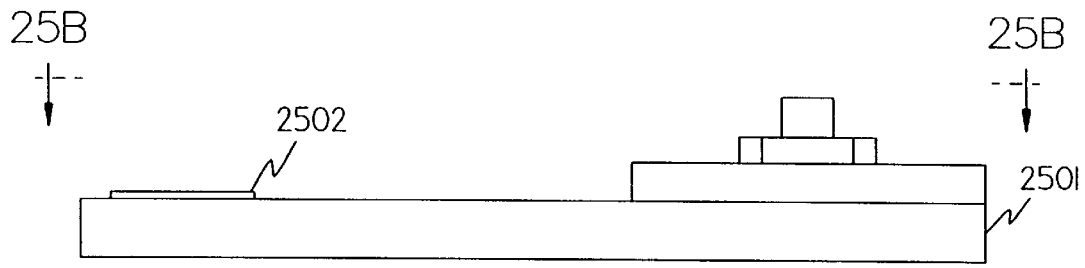
FIG. 25 shows an illustration of the resolution target apparatus with a magnified view of the 50 lp/mm bar patterns that are used for the modulation transfer function measurement.
Figure 25B:
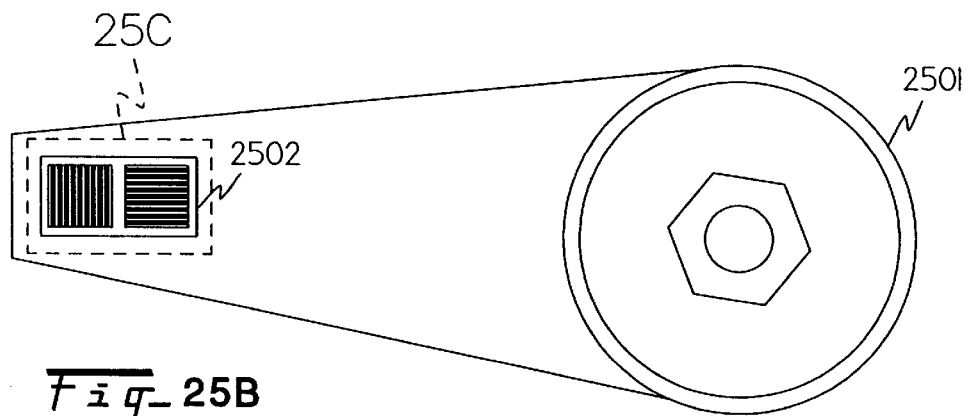
Figure 25C:
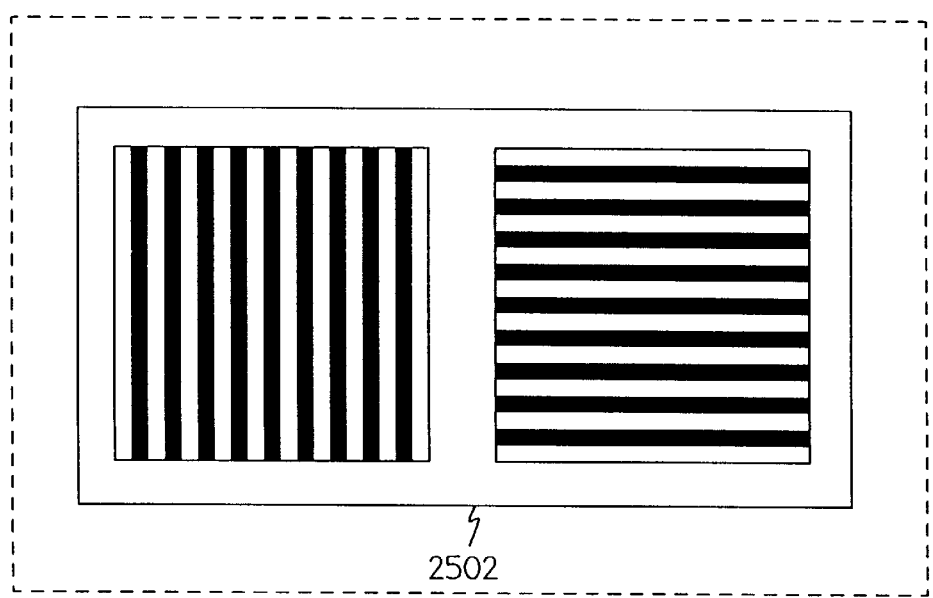

FIG. 25 shows the mechanical details of the "calibration plate", which is comprised of the calibration plate arm 2501 and the resolution target 2502. Although FIG. 25 does not show all of the details of the resolution target, the target carries the two 50 lp/mm bar patterns and other patterns used for alignment and other types of testing.

FIG. 26 is a block diagram of the metrology station used for measuring the duty cycles of the resolution target bar patterns. The metrology station uses a Nikon "Labophot-2" microscope 2601. The microscope uses variable voltage stabilized power supply 2602 to drive a quartz halogen lamp 2603. The illumination passes through a variable field iris diaphragm 2604 and is focused on the resolution target by a condenser 2605 with a numerical aperture of 0.85. The stage 2606 is manually adjustable in X, Y, and Z, where Z is the stage elevation for focusing.

Three planachromat objectives are used in the testing. The 4×, 0.2 NA objective 2607 and the 10×, 0.25 NA objective 2609 are used to inspect the resolution target and coverslip for defects. The 40×, 0.65 NA objective 2608 is used in the dimensional measurements of the target features.

The microscope turret assembly 2610 is a standard five-position turret with manual rotation for changing magnification. The eyepiece assembly 2611 is used for direct viewing of the resolution targets for defect inspection and alignment. The camera coupler 2612 adds an additional times-two magnification, to bring the total maximum available magnification to 80× for dimensional measurements. The magnification is adjustable at the coupler for fine adjustment of the magnification. The Sony model XC-77CE CCD camera 2613 uses square CCD cells 11 microns on a side and provides an NTSC standard video signal to the image capture system 2615.

Assembly 2614 is a set of electronic circuit boards identical to those in the imaging system of FIG. 22. The image capture system 2615 processes, digitizes, and stores the incoming images under control of the scan controller 2618. Only one image processor assembly 2617 is used in the Metrology Station, whereas the imaging system uses fifteen of the assemblies. The CPU 2618 commands the scan controller 2616 and image processor during calibration and image capture operations. The CPU 2618 is controlled by the operator working at a UNIX workstation 2620, interfaced to the CPU through a local area network 2619.

Figure 27A:
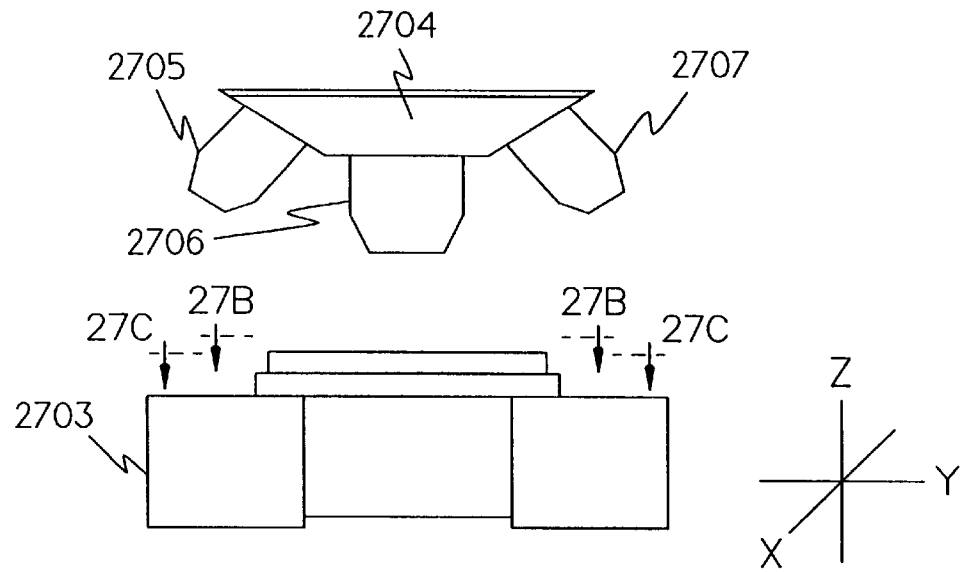
FIG. 27 shows a detail drawing of the two reference targets for calibrating the metrology station for duty cycle measurement, showing the mounting location of these targets on the microscope stage.
Figure 27B:
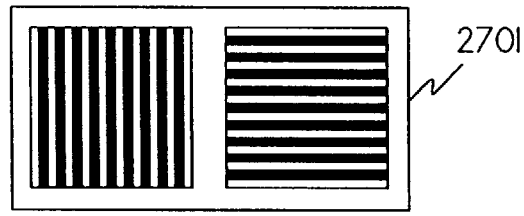
Figure 27C:
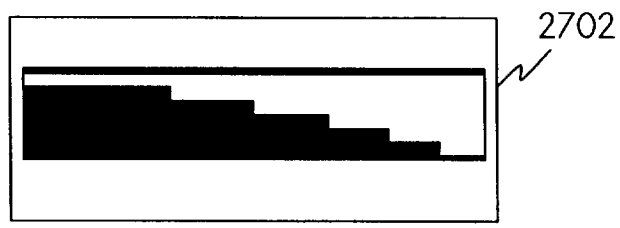

FIG. 27 is a detail drawing of the 50 lp/mm bar patterns of the NeoPath resolution target 2701 used for duty cycle calibration and the linewidth standard target 2702 used for magnification calibration. Both targets carry glass coverslips of approximately 150 micron thickness for use with the biological objectives 2705, 2706, and 2707, which are mounted to the turret 2704. The drawing shows how one or the other of the targets is mounted to the microscope stage 2703.

Figure 28:
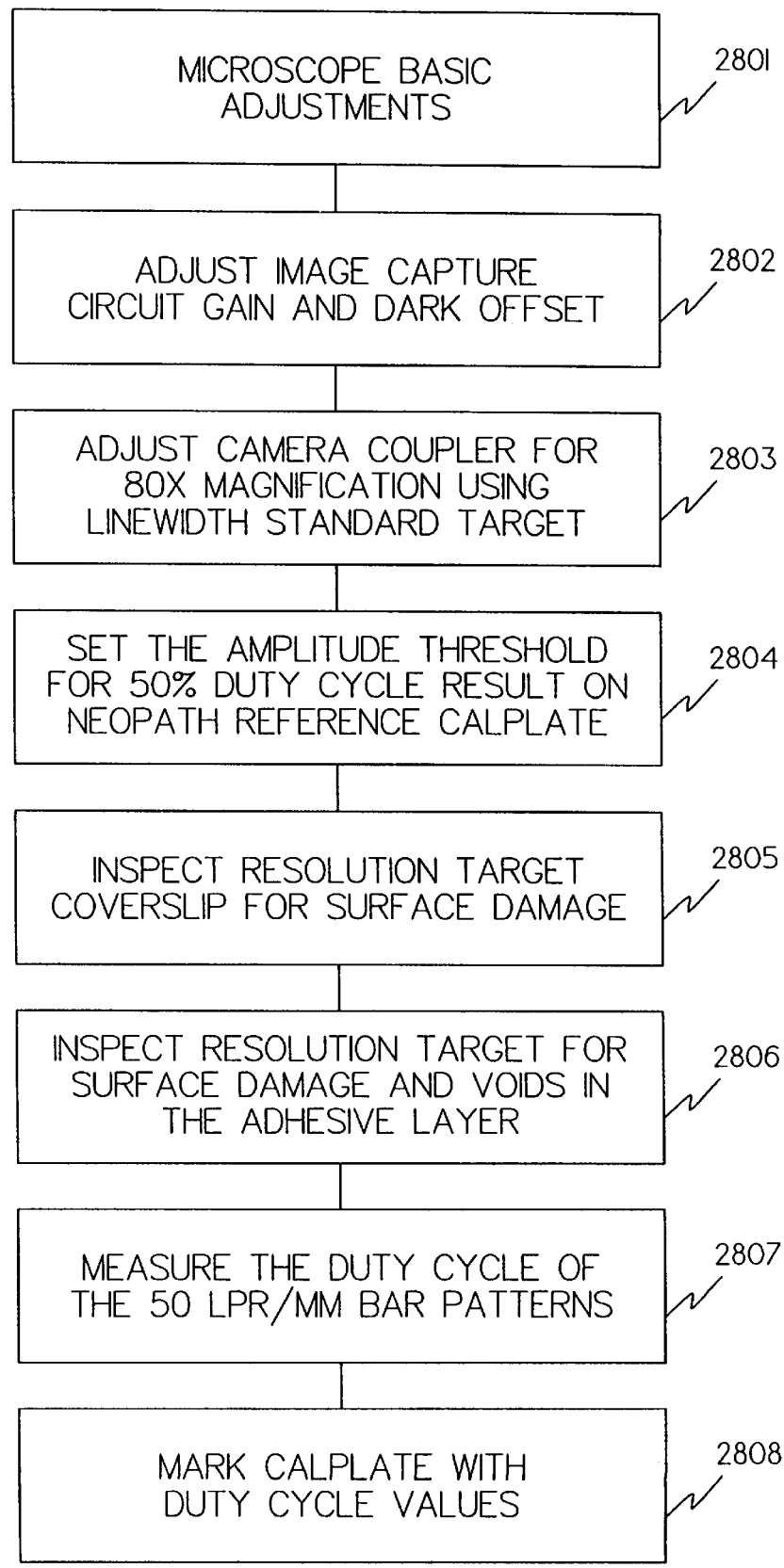
FIG. 28 shows a flow chart of the process of inspecting the resolution targets and measuring the duty cycles of the bar patterns.

FIG. 28 is a flow chart for the procedure for using the metrology station to inspect and measure calibration plate resolution targets. In step 2801, basic adjustments are made to the objective and condenser focusing, the illuminator intensity, the illuminator field diaphragm, the condenser aperture diaphragm, and the eyepiece focusing.

In step 2802, the Metrology Station electronics 2614 are used to execute a semi-automated calibration of the image capture system 2615 output level for zero light level by adjusting the dark offset and 50% light level by adjusting the image capture gain.

In step 2803, an automated measurement algorithm is executed to measure features on the linewidth measurement standard, 2702. The camera coupler 2613 is adjusted to yield the correct magnification using these measurements.

In step 2804, the Neopath reference resolution target 2701 is used for setting the edge detection threshold illustrated in FIG. 21. The threshold is adjusted until the duty cycle reported for the reference target falls within the range from 49.95% to 50.05%.

In step 2805, the 10× objective 2609 is used to inspect the surface of the actual resolution target under test for defects. Representative defects are shown in photographs to guide the operator, and maximum dimensions for various defect types are stated.

In step 2806, the 10× objective 2609 is used for inspecting the surface of the resolution target under test for defects. The stage elevation is first adjusted to bring the test pattern plane into focus. Photographs and dimensional specifications guide this inspection.

In step 2807, the 40× objective and automated image analysis software are used to measure the duty cycle values of the 50 lp/mm horizontal and vertical bar patterns. In step 2808, these values are marked on the calibration plate arm assembly and also stored in history files against the serial number of the calibration plate arm assembly.

In one example embodiment of the invention the compensation is done in a digital computer running software. The software is written in the C/C++ programming language. One example embodiment of a C/C++ duty cycle compensation routine is listed below.

```
/*Apply DCC to odd harmonics only*/
if (pk%2)
    {
    temp = fabs(sin(pk*PI*dutyCycle))*normalizedDC;
    if (IS_FZERO (temp))
        {
        slSysLog(SLOG_FMT(SEVERE_ID, fcnName),"Divide by zero error.");
        return (algMtfStatus_error);
        }
    mftAmplitude = pk*PI*dutyCycle*HYPOT(fittedReal, fittedImgn)/temp;
    }
else
    {
    temp = 2.0*normalizedDC;
    if (IS_FZERO(temp))
        {
        slSysLog(SLOG_FMT(SEVERE_ID, fcnName),"Divide by zero error.");
        return (algMtfStatus_error);
        }
    mtfAmplitude = pk*PI*HYPOT(fittedReal, fittedImgn)/temp;
    }
Copyright 1997 NeoPath, Inc.
```

The example duty cycle compensation routine is one applied to the method of MTF computation of Frost et al. in which the amplitude and phase of each harmonic of the test pattern image is computed in complex number space using a two-dimensional contour-fitting algorithm. A temporary variable is set to either two times the normalized dc value for the even harmonics or to a compensated value for the odd harmonics. The mtfAmplitude is then calculated as the harmonic times π times the amplitude of the peak of the complex model of the harmonic, all divided by the temporary variable. The amplitude of the peak is found by applying the "HYPOT" function to the imaginary and real parts of the best-fit model peak. The "HYPOT" function computes the square root of the sum of the squares of the two arguments "fittedReal" and "fittedImgn". In the case of the odd harmonics the temporary variable is the absolute value of the sine of the harmonic times π times the duty cycle all times the normalized DC value. Those skilled in the art will recognize that other methods of applying the dutycycle compensation, such as hardware based methods, or using special purpose processors such as a digital signal processor, are within the scope and spirit of the invention.

Further, the modulation transfer function test is of use in the characterization of an optical imaging system to demonstrate conformity of such an instrument to the requirements for a particular application. For example, such a measurement might be included in the built-in diagnostic test ensemble of an automated microscope to demonstrate that the system is capable of delivering images of sufficient resolution to accomplish a task in automated pattern recognition. The numerical outcome of the modulation transfer function test is compared to upper and lower limits. Failure of the instrument to conform to these limits causes a message to be sent to the user to warn of a performance deficiency or prevents the instrument for being used for the intended application.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method of utilizing a measured test pattern duty cycle, comprising the steps of:

a) imaging a test pattern having a duty cycle wherein the test pattern has an error in the duty cycle to generate a test pattern image;

b) processing the test pattern image to generate harmonics wherein each harmonic has an amplitude value; and c) computing an adjustment value for each amplitude value of the harmonics based on the measured test pattern duty cycle to compensate for the error in the duty cycle.

2. The method of claim 1 further comprising the step of conditioning the test pattern image to generate a conditioned test pattern image.

3. The method of claim 2 wherein the step of processing the test pattern further comprises performing a windowed FFT on the conditioned test pattern image.

4. The method of claim 1 wherein the step of computing an adjustment value for each amplitude value of the harmonics based on the measured test pattern duty cycle to compensate for the error in the duty cycle further comprises processing the test pattern image in accordance with the following equation:

$$MTF(n) = \frac{A_{OUT}(n)}{A_{OUT}(0)} \left| \frac{1}{\text{sinc}(n\pi D)} \right|$$

$$= \frac{A_{OUT}(n)}{A_{OUT}(0)} \left| \frac{n\pi D}{\sin(n\pi D)} \right|$$

where:

$A_{OUT}(0)$ = image average greyscale value $A_{OUT}(n)$ = amplitude of the nth harmonic $n$ = harmonic index (odd); and $D$ = duty cycle.

5. The method of claim 1 wherein the test pattern further comprises alternating transmissive and opaque bars.

6. The method of claim 1 wherein the step of processing the test pattern image further comprises performing a windowed FFT on the test pattern image.

7. The method of claim 1 wherein the test pattern image further comprises a grey scale image.

8. An apparatus for the measurement of flaws in a test pattern duty cycle from a predetermined reference value comprising:

a) a means for illuminating the test pattern;

b) a means for imaging the illuminated test pattern having an image output; and c) a means for processing the image output to determine a compensation for the flaws in the test pattern duty cycle based on the predetermined reference value.

9. The apparatus of claim 8 wherein the test pattern further comprises a patterned material that in some regions transmits light with little attenuation and in other regions is partially opaque to light.

10. The apparatus of claim 8 wherein the test pattern comprises an optical diffraction grating.

11. The apparatus of claim 8 wherein the means for imaging further comprises an automated microscope.

12. The apparatus of claim 8 wherein the means for illuminating further comprises an adjustable pulsed power supply, an arc lamp wherein light from the arc lamp is focused by a condenser onto the test pattern.

13. The apparatus of claim 8 wherein the means for imaging further comprises a charge coupled device camera.

14. The apparatus of claim 8 wherein the means for processing further comprises a field of view processor.

15. The apparatus of claim 8 wherein the means for processing further comprises a digital signal processor.

16. A method of compensating a modulation transfer function measurement of an optical imaging system for variation in a test pattern duty cycle comprising the steps of:

a) measuring an error in the test pattern duty cycle;

b) measuring a modulation transfer function; and c) compensating the modulation transfer function for the error in the test pattern duty cycle.

17. The method of claim 16 further comprising the step of computing the test pattern duty cycle as a ratio of length in a single cycle for which the test pattern duty cycle's value is at a high level divided by a period of the test pattern duty cycle.

18. The method of claim 16 further comprising the steps of measuring a system transfer function of the optical imaging system including measurement of both the modulation transfer function and a phase transfer function.

19. The method of claim 16 further comprising the steps of computing amplitude values of the odd harmonics for a reference value of duty cycle with adjustment to correct for the error in test pattern duty cycle, as expressed in the following equation:

where:

$$MTF(n) = \frac{A_{OUT}(n)}{A_{OUT}(0)} \left| \frac{1}{\text{sinc}(n\pi D)} \right|$$

$$= \frac{A_{OUT}(n)}{A_{OUT}(0)} \left| \frac{n\pi D}{\sin(n\pi D)} \right|$$

$A_{OUT}(0)$ = image average greyscale value $A_{OUT}(n)$ = amplitude of the nth harmonic $n$ = harmonic index (odd); and $D$ = duty cycle.

20. The method of claim 16 further comprising the step of checking the modulation transfer function measurement against a predetermined limit to warn of a performance deficiency in the optical imaging system.

21. An apparatus for compensating a modulation transfer function measurement of an optical imaging system for error in input test pattern duty cycle comprising:
 a) a means for illuminating a test pattern;
 b) a means for imaging the test pattern through the optical imaging system having an image output;
 c) a means for measuring the modulation transfer function in response to the image output; and
 d) a means for processing the measured modulation transfer function to compensate for error in the input test pattern duty cycle based on a predetermined compensation.

22. The apparatus of claim 21 wherein the test pattern further comprises an image transparency.

23. The apparatus of claim 22 wherein the test pattern is printed on a glass plate.

24. The apparatus of claim 21 wherein the optical imaging system further comprises a microscope.

25. The apparatus of claim 21 wherein the optical imaging system further comprises a substantially linear system.

26. The apparatus of claim 21 wherein the test pattern has a test pattern geometry having very small dimensions wherein the test pattern geometry further includes bar patterns having a duty cycle.

27. The apparatus of claim 21 wherein the optical imaging system is an automated microscope used in an automated cytology screening device.

28. The apparatus of claim 21 wherein the optical imaging system further comprises a sheet of photographic film.

29. The apparatus of claim 21 wherein the optical imaging system further comprises an array of photosensitive detectors.

30. The apparatus of claim 21 wherein the optical imaging system further comprises a telescope.

31. The apparatus of claim 21 wherein the optical imaging system further comprises a light detecting device capable of delivering a voltage proportional to an intensity of light incident on its surface and spatially separating an arriving pattern by location on the surface.

32. The apparatus of claim 21 wherein the means for processing further comprises a digital computer.

33. The apparatus of claim 21 further comprising a means for checking the modulation transfer function measurement against a predetermined limit to warn of a performance deficiency in the optical imaging system.

34. The apparatus of claim 23 wherein the apparatus is an optical imaging system and the optical imaging system is part of a cytological screening device.

* * * * *